US009792420B2

(12) United States Patent
Uno et al.

(10) Patent No.: US 9,792,420 B2
(45) Date of Patent: Oct. 17, 2017

(54) DEVICE AND METHOD FOR BIOMETRIC AUTHENTICATION

(71) Applicant: FUJITSU LIMITED, Kawasaki-shi (JP)

(72) Inventors: Kazuya Uno, Yokohama (JP); Yukihiro Abiko, Irvine, CA (US)

(73) Assignee: FUJITSU LIMITED, Kawasaki (JP)

( * ) Notice: Subject to any disclaimer, the term of this patent is extended or adjusted under 35 U.S.C. 154(b) by 705 days.

(21) Appl. No.: 13/850,691

(22) Filed: Mar. 26, 2013

(65) Prior Publication Data

US 2013/0207779 A1 Aug. 15, 2013

Related U.S. Application Data

(63) Continuation of application No. PCT/JP2010/067055, filed on Sep. 30, 2010.

(51) Int. Cl.
*G05B 19/00* (2006.01)
*G05B 23/00* (2006.01)
(Continued)

(52) U.S. Cl.
CPC ......... *G06F 21/32* (2013.01); *G06K 9/00093* (2013.01); *G06K 9/00926* (2013.01); *G06K 9/6255* (2013.01)

(58) Field of Classification Search
CPC .. G07C 9/00158; G07C 1/10; G07C 9/00111; G07C 9/00166; G07C 9/00563;
(Continued)

(56) References Cited

U.S. PATENT DOCUMENTS 6,285,780 B1 9/2001 Yamakita et al.
6,314,196 B1 11/2001 Yamaguchi et al.
(Continued)

FOREIGN PATENT DOCUMENTS

EP 2234324 A1 9/2010
JP 9-198501 7/1997
(Continued)

OTHER PUBLICATIONS

Notification of Transmittal of Translation of the International Preliminary Report on Patentability (Form PCT/IB/338, Form PCT/IB/373 & Form PCT/ISA/237), International Application No. PCT/JP2010/067055, 7 pages, dated Apr. 18, 2013.
(Continued)

*Primary Examiner* — Emily C Terrell
(74) *Attorney, Agent, or Firm* — Fujitsu Patent Center

(57) ABSTRACT

A biometric authentication device includes: a storage unit to store a first enrolled template and first information including a parameter representing an input environment of the first enrolled template; a receiving unit to receive biometric information from the terminal device, a second enrolled template stored in the terminal device, and second information including a parameter representing an input environment of the second enrolled template; an authentication unit to perform authentication by matching the received biometric information and the first enrolled template; a selecting unit to select the first enrolled template or the second enrolled template, based on the first and second information, when the biometric information is accepted; and an updating unit to update the first enrolled template stored in the storage unit to the second enrolled template when the second enrolled template is selected.

12 Claims, 24 Drawing Sheets

START
S301 SENSOR TYPES IDENTICAL? — YES → A; NO
S302 SELECT LATEST MATCHING INFORMATION
S303 CALCULATE SIMILARITY SCORE OF ENROLLED TEMPLATE AND ENROLLED TEMPLATE FOR UPDATE
S304 WEIGHTING PROCESS
S305 REFER TO ACCEPTED RATE OF ENROLLED TEMPLATE AND ENROLLED TEMPLATE FOR UPDATE
S306 CALCULATE ADJUSTMENT PARAMETER
S307 CALCULATE JUDGMENT VALUE
S308 JUDGMENT VALUE ≥ 0? — YES / NO
S309 SELECT ENROLLED TEMPLATE FOR UPDATE
S310 SELECT ENROLLED TEMPLATE
END

A
S311 CREATION DATE/TIME OF ENROLLED TEMPLATE FOR UPDATE IS MORE RECENT? — YES / NO
S312 SELECT ENROLLED TEMPLATE FOR UPDATE
S313 SELECT ENROLLED TEMPLATE
END

(51) Int. Cl.

| | |
|---|---|
| ***G06F 7/00*** | (2006.01) |
| ***G06F 7/04*** | (2006.01) |
| ***G08B 29/00*** | (2006.01) |
| ***G08C 19/00*** | (2006.01) |
| ***H04B 1/00*** | (2006.01) |
| ***H04B 3/00*** | (2006.01) |
| ***G06F 21/32*** | (2013.01) |
| ***G06K 9/00*** | (2006.01) |
| ***G06K 9/62*** | (2006.01) |

(58) Field of Classification Search

CPC ............. G06K 9/00892; G06K 9/6288; G06K 9/00006; G06K 9/00885; G06Q 20/40145; G06F 21/32; H04L 63/0861; H04L 2463/082; H04L 9/3231; G05B 1/03

USPC ...................... 340/5.82, 5.81, 5.52–5.53, 5.8

See application file for complete search history.

(56) References Cited

U.S. PATENT DOCUMENTS

| | | | | |
|---|---|---|---|---|
| 7,542,590 | B1 | 6/2009 | Robinson et al. | |
| 8,150,108 | B2* | 4/2012 | Miller ................ | G06K 9/00892 340/5.53 |
| 2001/0036301 | A1 | 11/2001 | Yamaguchi et al. | |
| 2002/0147921 | A1* | 10/2002 | Bullock ............. | G06K 9/00885 726/4 |
| 2002/0174347 | A1* | 11/2002 | Ting ........................ | G06F 21/32 713/186 |
| 2006/0239511 | A1* | 10/2006 | White ..................... | G06F 21/32 382/115 |
| 2008/0077359 | A1 | 3/2008 | Ito | |
| 2009/0289760 | A1* | 11/2009 | Murakami ......... | G06K 9/00885 340/5.82 |
| 2009/0309698 | A1* | 12/2009 | Headley ................ | G06F 21/316 340/5.52 |
| 2011/0138187 | A1* | 6/2011 | Kaga et al. ................... | 713/186 |
| 2011/0205016 | A1* | 8/2011 | Al-Azem et al. ............ | 340/5.52 |
| 2012/0131350 | A1* | 5/2012 | Atherton ................. | G06F 21/32 713/186 |

FOREIGN PATENT DOCUMENTS

| | | |
|---|---|---|
| JP | 10-275236 | 10/1998 |
| JP | 2002-74364 | 3/2002 |
| JP | 2003-316746 | 11/2003 |
| JP | 2005-275661 | 10/2005 |

OTHER PUBLICATIONS

International Search Report, mailed in connection with PCT/JP2010/067055 and mailed Oct. 26, 2010.

Extended European Search Report dated Apr. 4, 2017 for corresponding European Patent Application No. 0857847.7, 8 pages.

* cited by examiner

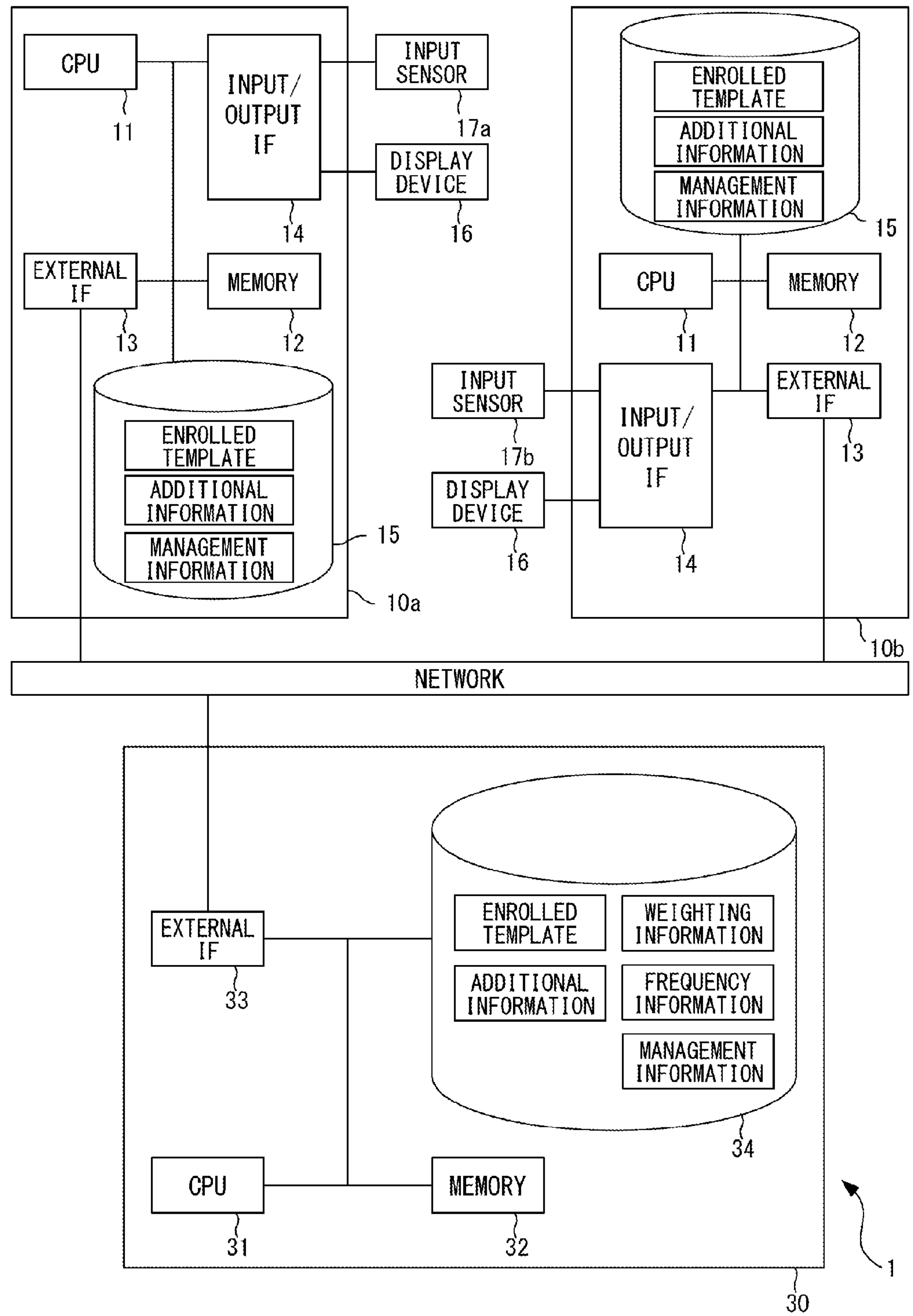
F I G. 1

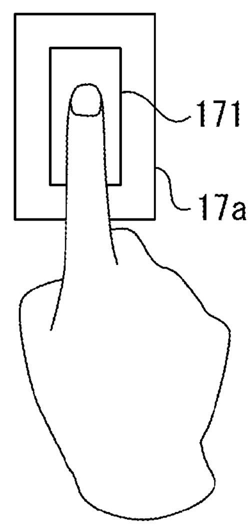
F I G. 2

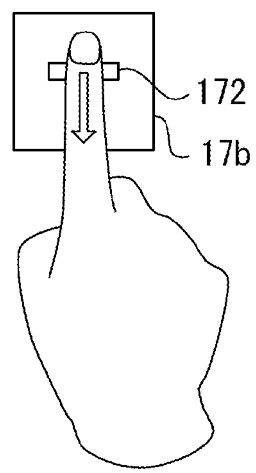
F I G. 3

| USER ID | ENROLLED TEMPLATE | ADDITIONAL INFORMATION | CREATION DATE/TIME | ACCEPTED RATE |
|---|---|---|---|---|
| User005 | DATA R005 | DATA A005 | 2009/09/03/ 08.41.50 | 120/140 |
| User008 | DATA R008 | DATA A008 | 2009/08/02/ 13.15.12 | 5/5 |
| User015 | DATA R015 | NULL | 2009/07/02/ 10.02.55 | 1/1 |
| User030 | DATA R030 | DATA A030 | 2008/03/12/ 17.01.53 | 150/160 |
| User105 | DATA R105 | NULL | 2009/07/02/ 10.10.33 | 67/80 |

FIG. 4

| USER ID | Total | TODAY | ONE DAY EARLIER | ... | n-DAY EARLIER |
|---|---|---|---|---|---|
| User005 | 120/140 | 3/3 | 15/16 | ... | 10/11 |
| User008 | 5/5 | 0/0 | 1/1 | ... | 0/0 |
| User015 | 1/1 | 0/0 | 1/1 | ... | 0/0 |
| User030 | 150/160 | 0/0 | 1/1 | ... | 0/0 |
| User105 | 67/80 | 0/0 | 1/1 | ... | 0/0 |

FIG. 5

| SENSOR TYPE PATTERN (FOR ENROLLMENT/MATCHING) | INITIAL VALUE |
|---|---|
| Type1 / Type1 | 1 |
| Type1 / Type2 | 1.5 |
| Type2 / Type1 | 2.2 |
| Type2 / Type2 | 1 |

FIG. 6

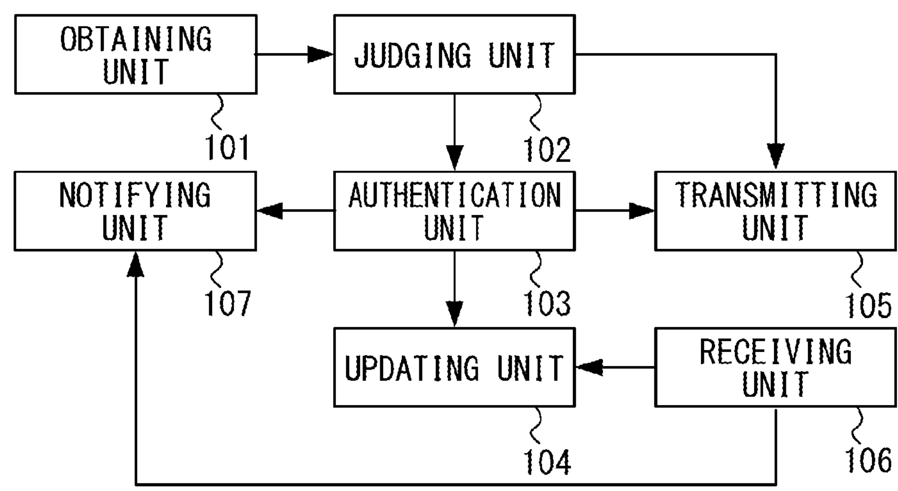
F I G. 7

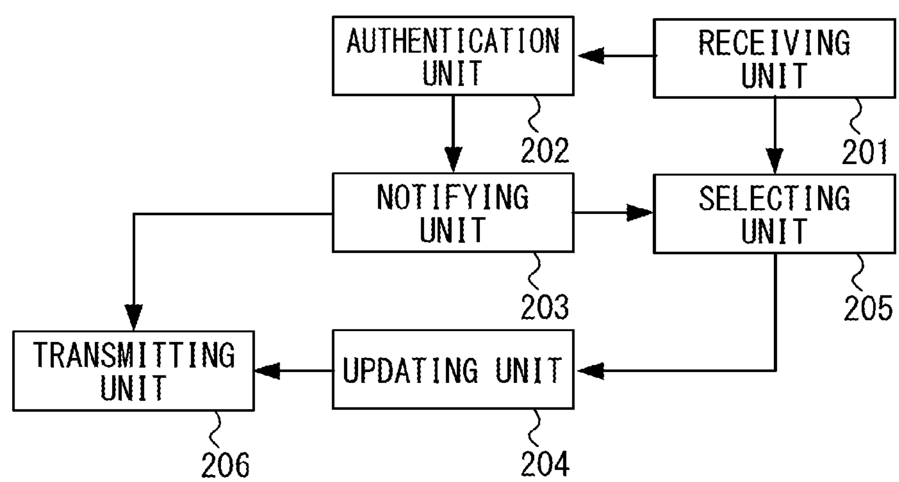
F I G. 9

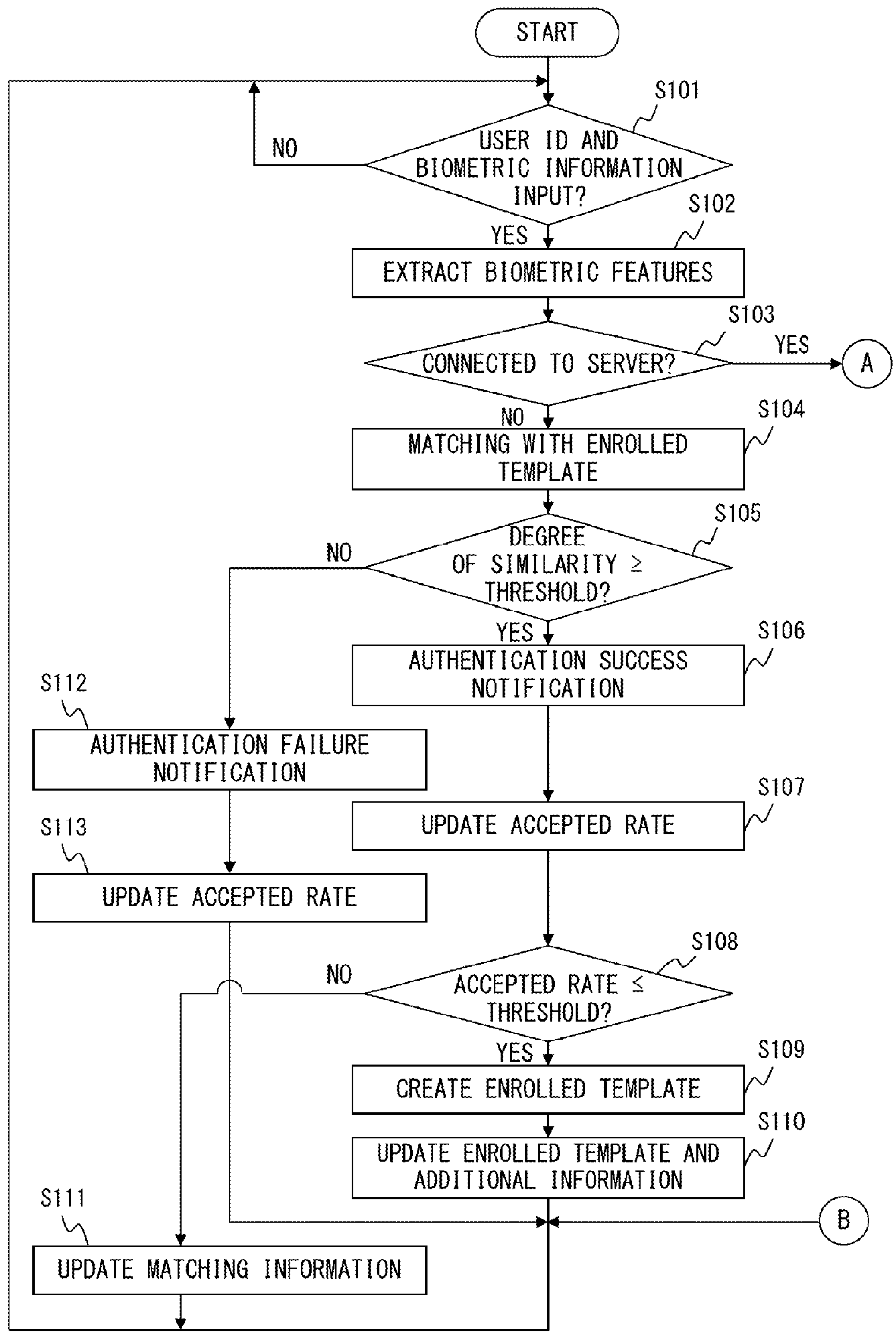
F I G. 10A

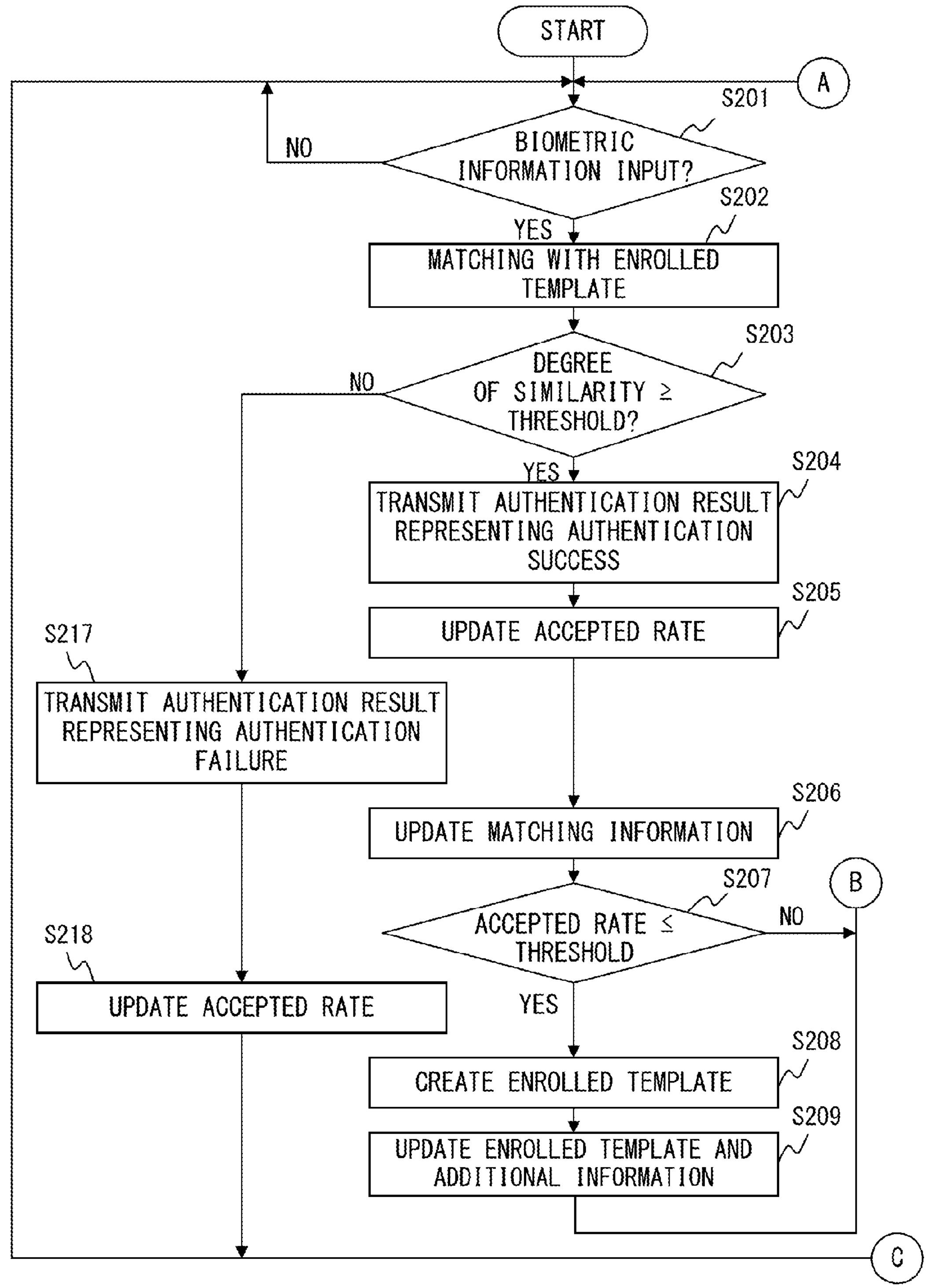
F I G. 1 1 A

| SENSOR TYPE (FOR ENROLLMENT/MATCHING) | INITIAL VALUE | SYSTEM VALUE |
|---|---|---|
| Type1 / Type1 | 1 | 1.1 |
| Type1 / Type2 | 1.5 | — |
| Type2 / Type1 | 2.2 | 1.7 |
| Type2 / Type2 | 1 | 1.3 |

FIG. 14

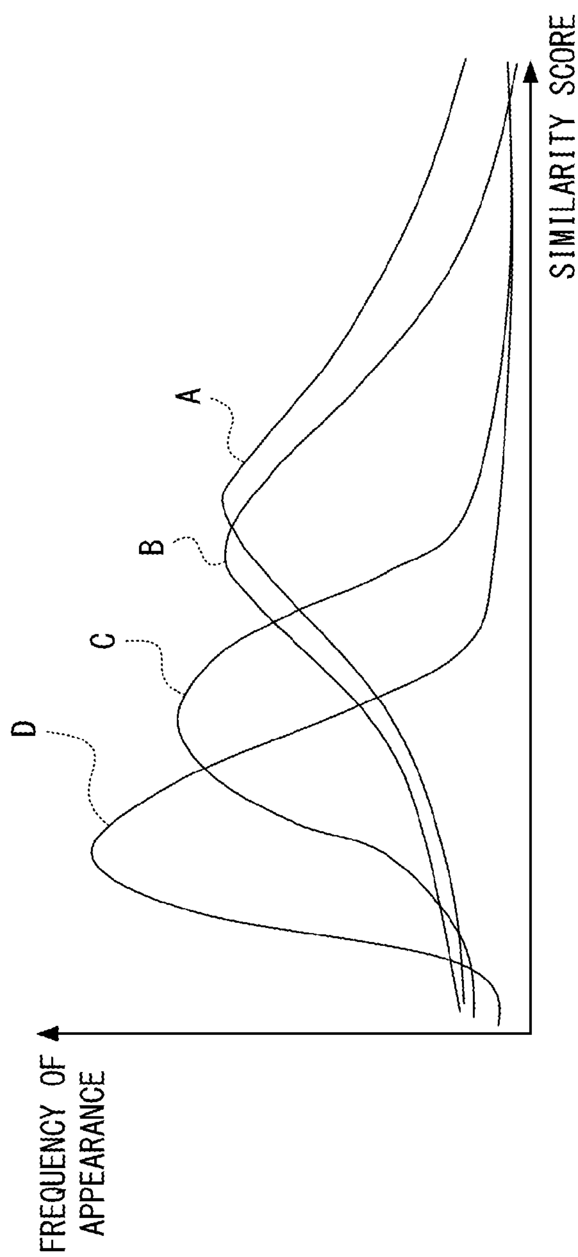
F I G. 1 6

| SENSOR TYPE (FOR ENROLLMENT/ MATCHING) | INITIAL VALUE | SYSTEM VALUE | USER ID | PERSONAL VALUE |
|---|---|---|---|---|
| Type1 / Type1 | 1 | 1.1 | User001 | 1.2 |
| | | | User002 | 1 |
| | | | User003 | — |
| | | | ... | ... |
| | | | User105 | 1.1 |
| Type1 / Type2 | 1.5 | — | User001 | — |
| | | | User002 | — |
| | | | User003 | — |
| | | | ... | ... |
| | | | User105 | — |
| Type2 / Type1 | 2.2 | 1.7 | User001 | 1.6 |
| | | | User002 | 1.3 |
| | | | User003 | — |
| | | | ... | ... |
| | | | User105 | 2.3 |
| Type2 / Type2 | 1 | 1.3 | User001 | 1.2 |
| | | | User002 | 1.7 |
| | | | User003 | — |
| | | | ... | ... |
| | | | User105 | 1 |

FIG. 18

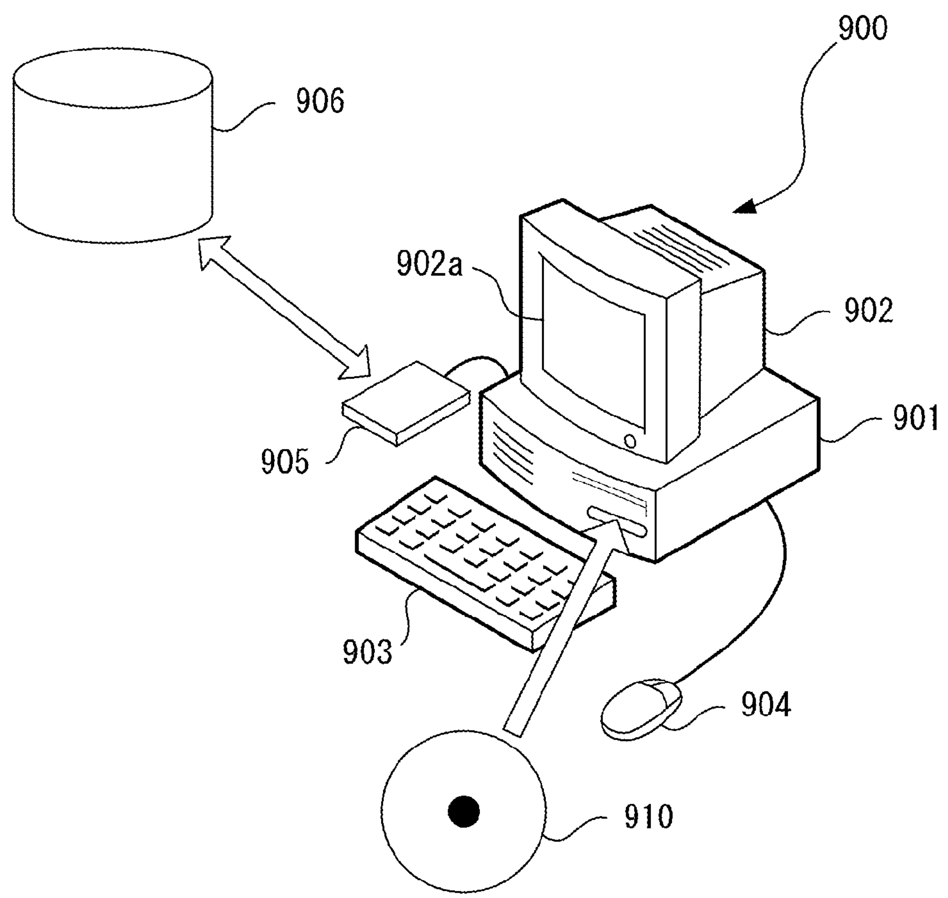
F I G. 2 1

DEVICE AND METHOD FOR BIOMETRIC AUTHENTICATION

CROSS-REFERENCE TO RELATED APPLICATION

This application is a continuation application of International Application PCT/JP2010/067055 filed on Sep. 30, 2010 and designated the U.S., the entire contents of which are incorporated herein by reference.

FIELD

The present invention relates to a technique to perform personal authentication using biometric information.

BACKGROUND

A biometric authentication system including a plurality of clients as terminal devices to input biometric information and a server performing biometric authentication by matching biometric information input at the client and a enrolled template biometric information enrolled in advance is known. In this biometric authentication system, each of the plurality of clients has a enrolled template performs biometric authentication based on the enrolled template, when connection with the server is not available.

In the biometric authentication system described above, the biometric information has a characteristic that difference from the enrolled template becomes larger according to environment or the biological body's change over time. That is, due to the difference in biometric information input from the plurality of clients and the elapse of time from the enrollment of the template, the biometric information becomes more subject to discarding, and the authentication rate decreases although the person to be authenticated is the corresponding person. With respect to such a problem, a technique to update the enrolled template using accepted biometric information is known. In addition, a technique to perform grouping of a plurality of clients based on the setting environment, and to update the enrolled template for each group is known.

In the technique to update the enrolled template using accepted biometric information, the client adds a time stamp to accepted biometric information, and the server collects the biometric information with the added time stamp. In addition, the server sets the biometric information with the latest time stamp among collected biometric information, and transmits the biometric information to the client. According to this, the client and the server can use the latest enrolled template.

Meanwhile, in the technique to update the enrolled template for each group, the plurality of clients are subjected to grouping based on the setting environment, and the server manages the enrolled template for each group with respect to the biometric information of each of the registrants. In addition, when updating the enrolled template using the accepted biometric information, the server updates only the enrolled template of the group to which the client with the input of biometric information belongs to. Accordingly, the discarding of biometric information due to the difference in input environment may be reduced. Note that related art is described, for example, in Japanese Laid-open Patent Publication No. 9-198501 and Japanese Laid-open Patent Publication No. 2003-316746.

However, according to the technique to update the enrolled template using the accepted biometric information, there is a possibility that biometric information input under an input environment that is different from the input environment of biometric information used for the update of the enrolled template may be discarded. For example, in a biometric authentication system using the fingerprint as the biometric information, it is assumed that there is a client that inputs biometric information by a slide-type fingerprint sensor, and a client that inputs biometric information by a flat-type fingerprint sensor. In such a biometric authentication system, when the enrolled template is updated by biometric information input by a flat-type fingerprint sensor, the input system of biometric information input by a slide-type fingerprint sensor is different from the enrolled template even though the fingerprint is the same. Due to this difference in the input system, there is a possibility that a difference is generated between the enrolled information and the biometric information, and the biometric information is discarded.

Meanwhile, according to the technique to update the enrolled template for each group, in a case such as when the enrolled template is updated based on biometric information input only in a certain group, there is a possibility that the biometric information is not accepted when biometric authentication is performed in another group. As described above, since the biological body being the basis of biometric information changes over time, when managing the enrolled template for each group and biometric authentication is performed by a client of a group for which the enrolled template is not updated for a certain period, there is a possibility that biometric information is discarded because the enrolled template is old with respect to input biometric information.

As described above, the conventional technique to update the enrolled template using the accepted biometric information has a problem that the enrolled template is not updated to appropriate biometric information.

SUMMARY

According to an aspect of the embodiments, a biometric authentication device that performs biometric authentication based on biometric information input to a connected terminal device, includes: a storage unit configured to store a first enrolled template and first information including a parameter representing an input environment of the first enrolled template; a receiving unit configured to receive biometric information transmitted from the terminal device, a second enrolled template stored in the terminal device, and second information including a parameter representing an input environment of the second enrolled template; an authentication unit configured to perform authentication of a person who inputs the biometric information by matching the received biometric information and the first enrolled template; a selecting unit configured to select the first enrolled template or the second enrolled template, based on the first information and the second information, when the biometric information is accepted by the authentication unit; and an updating unit configured to update the first enrolled template stored in the storage unit to the second enrolled template when the second enrolled template is selected by the selecting unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates the hardware configuration of a biometric authentication system according to a first embodiment.

FIG. 2 illustrates a flat-type fingerprint sensor.

FIG. 3 illustrates a slide-type fingerprint sensor.

FIG. 4 illustrates management information.

FIG. 5 illustrates frequency information.

FIG. 6 illustrates weighting information.

FIG. 7 illustrates the functional configuration of a client device.

FIG. 9 illustrates the functional configuration of a server device.

FIGS. 10A and 10B are flowcharts illustrating the overall operation of the client device.

FIGS. 11A and 11B are flowcharts illustrating the overall operation of the server device.

FIG. 14 illustrates an weighting table in a second embodiment.

FIG. 16 illustrates the distribution of similarity scores.

FIG. 18 illustrates weighting information in a third embodiment.

FIG. 21 illustrates an example of a computer system to which the present invention is applied.

DESCRIPTION OF EMBODIMENTS

Figure 8:
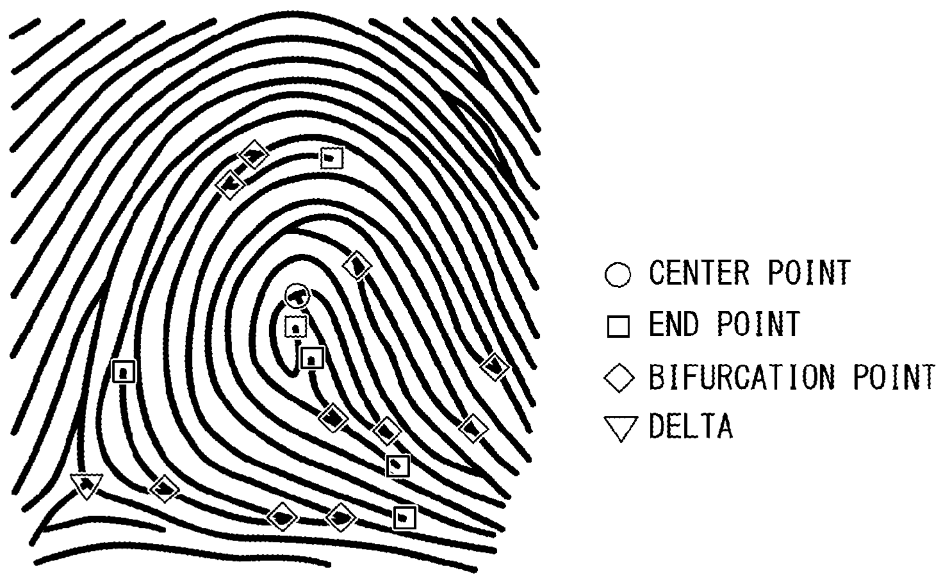
FIG. 8 illustrates minutia information.

Hereinafter, embodiments of the present invention are explained with reference to the drawings.

First Embodiment

The hardware configuration of a biometric authentication system according to the first embodiment is explained. FIG. 1 illustrates the hardware configuration of a biometric authentication system according to the first embodiment. FIG. 2 illustrates a flat-type fingerprint sensor. FIG. 3 illustrates a slide-type sensor.

As illustrated in FIG. 1, an biometric authentication system 1 according to the first embodiment includes client devices (terminal devices) 10*a* and 10*b*, and a server device (biometric authentication device) 30. The client devices 10*a* and 10*b* and the server device 30 are connected to each other via a network. The client devices 10*a* and 10*b* are a terminal device for the user being the person to be authenticated by the biometric authentication to input biometric information. The server device 30 performs biometric authentication by matching biometric information input by the client devices 10*a* and 10*b* and a enrolled template stored in advance. In addition, the client devices 10*a* and 10*b* respectively have a enrolled template and perform biometric authentication using the enrolled template that they have, when the connection to the server device 30 is disconnected. In the first embodiment, it is assumed that the biometric authentication system 1 uses the fingerprint as biometric information. In addition, in the explanation hereinafter, when the client devices 10*a* and 10*b* are not distinguished, these are collectively referred to as the client device 10.

The client device 10 includes a CPU (Central Processing Unit) 11, a memory 12, an external IF (Interface) 13, an input/output IF 14, a storage unit 15. The CPU 11 performs the control of the entire device. The memory 12 is a main memory device used for the control by the CPU 11. The external IF 13 is an interface for connecting the client device 10 to the network. The input/output IF 14 is an interface for connecting the client device 10 to an input device and to an output device. To the input/output IF 14, a display device 16 is connected as the output device. This display device is assumed as a touch panel. To the input/output IF 14 of the client device 10*a*, an input sensor 17*a* is connected as the input device, and to the input/output IF 14 of the client device 10*b*, an input sensor 17*b* is connected as the input device. Meanwhile, in the explanation hereinafter, when the input sensor 17*a* and the input sensor 17*b* are not distinguished, they are collectively referred to as the input sensor 17.

The storage unit 15 stores the enrolled template, additional information, and management information. The enrolled template is created based on biometric information input at the time of the biometric authentication. In addition, the enrolled template is prepared for each user to be the authentication target. The additional information includes the user ID, the sensor type pattern, the matching information, the accepted rate, the creation date/time as a parameter. The sensor type pattern represents the combination of a type of the input sensor 17 to which biometric information corresponding to the enrolled template is input, and a type of the input sensor 17 to which biometric information corresponding to the matching information is input. The matching information is created based on biometric information accepted in biometric authentication using the enrolled template, and is used for the selection criterion of the enrolled template described later. In addition, the matching information includes the date/time of input to the input sensor 17. The accepted rate represents the rate at which biometric information is accepted (authentication success) in biometric authentication using the enrolled template stored in the storage unit 15. The accepted rate is indicated by the "acceptance count/authentication count". The created date/time represents the date and time at which the enrolled template stored in the storage unit 15 is created. Meanwhile, the management information is explained later.

The input sensor 17*a* is a flat-type fingerprint sensor, as illustrated in FIG. 2. The input sensor 17*a* includes a flat-type sensor unit 171, and with a finger being put on the sensor unit 171, reads out the fingerprint of the person being the authentication target. The input sensor 17*b* is a slide-type print sensor, as illustrated in FIG. 3. The input sensor 17*b* includes a slide-type sensor unit 172, and with a finger being slide on the sensor unit 172, reads of the fingerprint of the person being the authentication target. Thus, in the first embodiment, the input methods of the fingerprint of the input sensor 17*a* and the input sensor 17*b* are different, and the sensor type represents either the input sensor 17*a* or the input sensor 17*b*. In this sensor type, the input sensor 17*a* is indicated by Type1, and the sensor 17*b* is indicated by Type2.

The server device 30 includes a CPU 31, a memory 32, an external IF 33, a storage unit 34. The CPU 31 performs the control of the entire device. The memory 32 is a main memory device used for the control by the CPU 31. The external IF 33 is an interface for connecting the server device to the network. The storage unit 34 stores the enrolled template, the additional information, weighting information, frequency information, and management information described later.

Next, the management information is explained. FIG. 4 illustrates the management information.

The management information is stored in each of the storage unit 15 and the storage 34, and as illustrated in FIG. 4, associates the user ID, the enrolled template, the additional information, the creation date/time, and the accepted rate. The user ID is a unique identifier for a user being the authentication target. The enrolled template represents the file of the enrolled template corresponding to the user ID. The additional information represents the file of the additional information corresponding to the enrolled template. The creation date/time represents the date/time of creation of the corresponding enrolled template. The accepted rate represents the accepted rate of the corresponding enrolled template. The client device 10 and the server device 30 recognize the correspondence relationship between the user ID and the enrolled template, the correspondence relationship between the enrolled template and the additional information, the correspondence relationship between the enrolled template and the creation date/time, by referring to the management information stored in their storage unit.

Next, the frequency information is explained. FIG. 5 illustrates the frequency information.

As illustrated in FIG. 5, the frequency information associate the user ID, the accepted rate for each day, and the total accepted rate up to the present. Each accepted rate is indicated by the "acceptance count/authentication count", in the similar manner to the additional information.

Next, the weighting information in the first embodiment is explained. FIG. 6 illustrates the weighting information in the first embodiment.

As illustrated in FIG. 6, the weighting information associates the sensor type pattern and an initial value specified in advance. Here, the sensor type pattern identifies Type1 or Type2 in the similar manner to the additional information described above.

Next, the functional configuration of the client device is explained. FIG. 7 illustrates the functional configuration of the client device. FIG. 8 illustrates minutia information.

As illustrated in FIG. 7, the client device 10 includes, as illustrated in FIG. 7, an obtaining unit 101, a judging unit 102, an authentication unit 103, an updating unit 104, a transmitting unit 105, a receiving unit 106 as functions. These functions are realized by the cooperation of the CPU 11 and the memory 12. The obtaining unit 101 obtains biometric information input to the input sensor 18 and the user ID input by the display device 16, and extracts biometric features of the biometric information. Here, the extracted biometric features are minutia information as illustrated in FIG. 8. The minutia information represents the center point being the center of the fingerprint, the endpoint indicating the edge of the ridge, the bifurcation point indicating a point at which the ridge branches into two, the delta indicating a point at which the ridge branches into three. The judging unit 102 judges whether or not the client device 10 is connected to the server device 30. The authentication unit 103 performs biometric authentication by matching the enrolled template stored in the storage unit 15 and biometric information obtained by the obtaining unit 101, for the user ID obtained by the obtaining unit 101, when the client device 10 is not connected to the server device 30. The matching process calculates the degree of similarity of the enrolled template and the minutia information of the biometric information, and the biometric information is accepted when the degree of similarity is equal to or above a specified threshold. The updating unit 104 updates the enrolled template and the additional information stored in the storage unit 15. The transmitting unit 105 transmits biometric information obtained by the obtaining unit 101 to the server device 30 when the client device 10 is connected to the server device 30. In addition, the transmitting unit 105 transmits the enrolled template and the additional information stored in the storage unit 15 to the server device 30. The receiving unit 106 receives the authentication result and the enrolled template transmitted by the server device 30. The notifying unit 107 makes the authentication result by the authentication unit 103 and the authentication result by the server device 30 displayed on the display device 16, to notify the user being the person who input the biometric information of the result.

Next, the functional configuration of the server device is explained. FIG. 9 illustrates the functional configuration of the server device.

The server device 30 includes, as illustrated in FIG. 9, a receiving unit 201, an authentication unit 202, a notifying unit 203, an updating unit 204, a selecting unit 205, and a transmitting unit 206 as functions. These functions are realized by the cooperation of the CPU 31 and the memory 32. The receiving unit 201 receives the biometric information, the enrolled template, and the additional information from the client device 10. The authentication unit 202 performs biometric authentication by matching the enrolled template stored in the storage unit 34 and the biometric information received by the receiving unit 201. In the similar manner to the matching by the authentication unit 103, the matching process calculates the degree of similarity of the enrolled template and the minutia information of the biometric information, and the biometric information is accepted when the degree of similarity is equal to or above a specified threshold. The notifying unit 203 notifies the user of the authentication result by making the transmitting unit 206 transmit the authentication result by the authentication unit 202 to the client device 10. The updating unit 204 updates the enrolled template and corresponding additional information. The selecting unit 205 selects the enrolled template updated by the updating unit 204 based on the additional information. Here, the selecting unit 205 selects either the enrolled template received by the receiving unit 201 or the enrolled template stored in the storage unit 34. The transmitting unit 206 transmits the authentication result by the authenticating unit 202 and the enrolled template stored in the storage unit 34 to the client device 10.

Figure 10B:
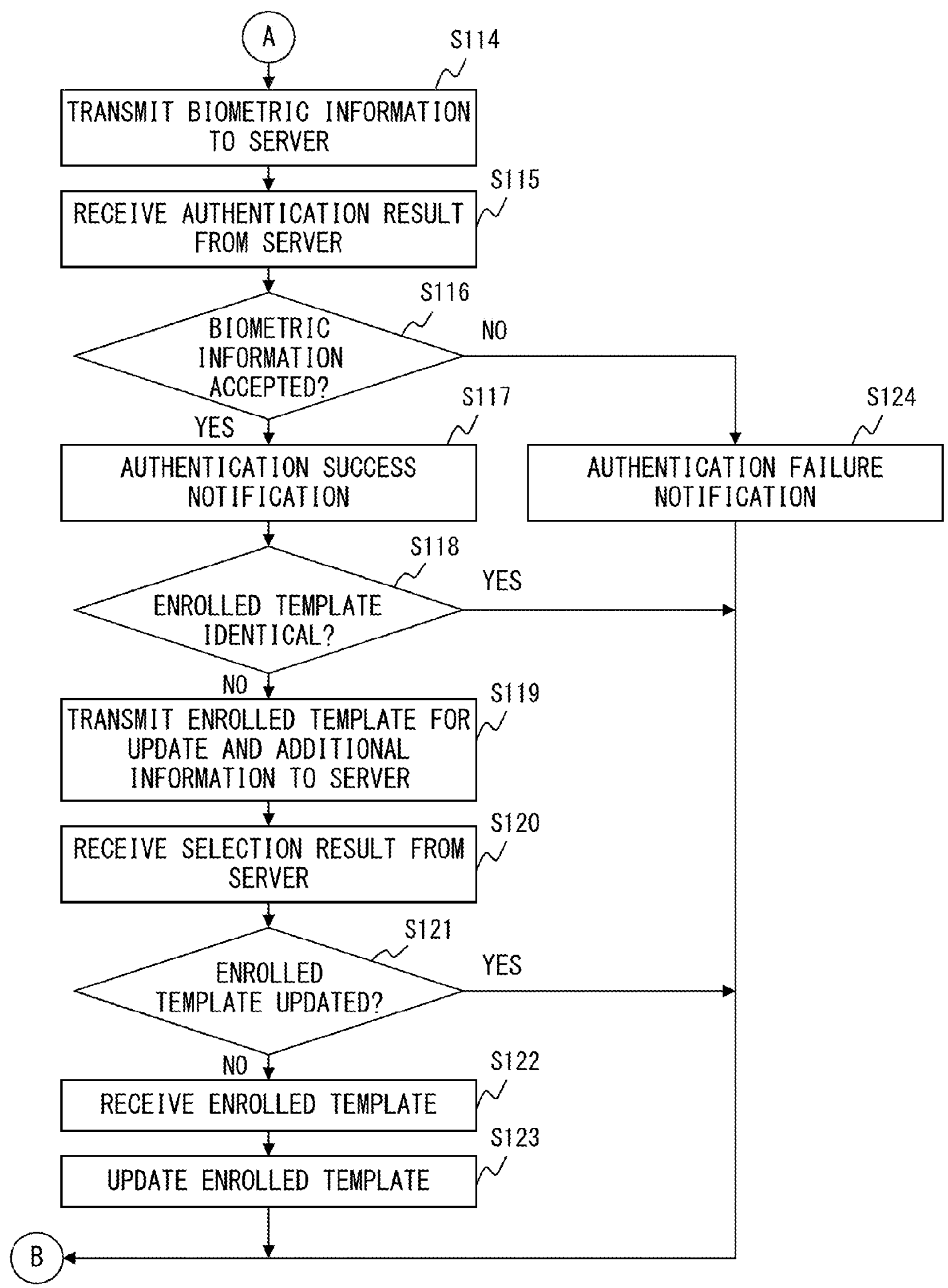

Next, the overall operation of the client device is explained. FIGS. 10A and 10B are flowcharts illustrating the overall operation of the client device.

As illustrated in FIGS. 10A and 10B, first, the obtaining unit 101 judges whether the user ID is input to the display device 16, and biometric information is input to the input sensor 17 (S101).

When the user ID and the biometric information are input (S101, YES), the obtaining unit 101 extracts biometric features from the biometric information (S102). Next, the judging unit 102 judges whether the client device 10 is connected to the server device 30 (S103).

When the client device 10 is not connected to the server device 30 (S103, NO), the authentication unit 103 performs the matching of the input biometric information with the enrolled template stored in the client device and corresponding to the input user ID (S104), and judges whether the degree of similarity of the biometric information and the enrolled template is equal to or above the threshold (S105). Here, the threshold of the degree of similarity is assumed as 80%.

When the degree of similarity is equal to or above the threshold (S105, YES), the notifying unit 107 notifies the user of the acceptance of the biometric information and the success of the authentication (S106). Next, the updating unit 104 updates the accepted rate in the additional information and the management information corresponding to the enrolled template (S107). Here, the updating unit 104 increments the acceptance count and the authentication count. Next, the updating unit judges whether the accepted rate in the additional information is equal to or below the threshold (S108). Here, the threshold of the accepted rate is assumed as 50%.

When the accepted rate is equal to or below the threshold (S108, YES), the updating unit 104 creates a enrolled template based on the biometric information accepted by the authentication unit 103 (S109). The updating unit 104 replaces the enrolled template stored in the storage unit 15 with the created enrolled template, and updates the additional information (S110). In this update, the updating unit 104 sets the sensor type in the additional information as the type of the input sensor 17, sets 0/0 as the accepted rate, and sets the current date/time as the creation date/time. Meanwhile, together with this update, the updating unit 104 may also update the accepted rate, the creation date/time and the like corresponding to the additional information being the update target in the management information. Then the obtaining unit 101 judges whether the user ID and biometric information are input, again (S101).

On the other hand, when the accepted rate is not equal to or below the specified threshold (S108, NO), the updating unit 104 replaces the matching information included in the additional information with the biometric information accepted by the authenticating unit 103 (S111). Then the obtaining unit 101 judges whether the user ID and biometric information are input, again (S101).

Meanwhile, in the judgment in step S105, when the degree of similarity is not equal to or above the specified threshold (S105, NO), the notifying unit 107 notifies the user of the discarding of the biometric information and failure of the authentication (S112). The updating unit 104 updates the accepted rate in the additional information and the management information (S113). Here, the updating unit 104 increments only the authentication count. Then the obtaining unit 101 judges whether the user ID and biometric information are input, again (S101).

Meanwhile, in the judgment in step S103, when the client device 10 is connected to the server device 30 (S103, YES), the transmitting unit 105 transmits the biometric information accepted by the authentication unit 103 to the server device 30 (S114). The receiving unit 106 receives the authentication result for the biometric information transmitted from the transmitting unit 105 from the server device 30 (S115). It is assumed that, in this authentication result, the file name of the enrolled template used for matching in the server device 30 is included. The notifying unit 107 judges, according to the authentication result received by the receiving unit 106, whether the biometric information transmitted from the transmitting unit 105 was accepted by the server device 30 (S116).

When the biometric information was accepted by the server device 30 (S116, YES), the notifying unit 107 notifies the user of the success of the authentication (S117). The transmitting unit 105 judges, based on the authentication result, whether the enrolled template in the server device 30 and the enrolled template stored in the storage unit 15 are identical (S118).

When the enrolled templates are not identical (S118, NO), the transmitting unit transmits the enrolled template stored in the storage unit 15 to the server device 30 as a enrolled template for update, together with the corresponding additional information (S119). The receiving unit 106 receives the selection result by the selecting unit 205 from the server device 30 (S120). The updating unit 104 judges, based on the received selection result, whether the enrolled template of the server device 30 was updated (S121).

When the enrolled template of the server device 30 was not updated (S121, NO), the receiving unit 106 receives the enrolled template from the server device 30 (S122). The updating unit 104 replaces the enrolled template stored in the storage unit 15 with the enrolled template received by the receiving unit 106 (S123). Then the obtaining unit 101 judges whether the user ID and biometric information are input, again (S101).

Meanwhile, in the judgment in step S121, when the enrolled template of the server device 30 was updated (S121, YES), the obtaining unit 101 returns to the judgment of whether the user ID and biometric information are input, again (S101).

Meanwhile, in the judgment in step S118, when the enrolled templates are identical (S118, YES), the obtaining unit 101 returns to the judgment of whether the user ID and biometric information are input, again (S101).

In the judgment in step S116, when biometric information is not accepted by the server device 30 (S116, NO), the notifying unit 107 notifies the user of the failure of the authentication (S124). Then the obtaining unit 101 returns to the judgment of whether the user ID and biometric information are input, again (S101).

Meanwhile, in step S101, when the user ID and biometric information are not input, the obtaining unit 101 judges whether the user ID and biometric information are input, again (S101).

Figure 11B:
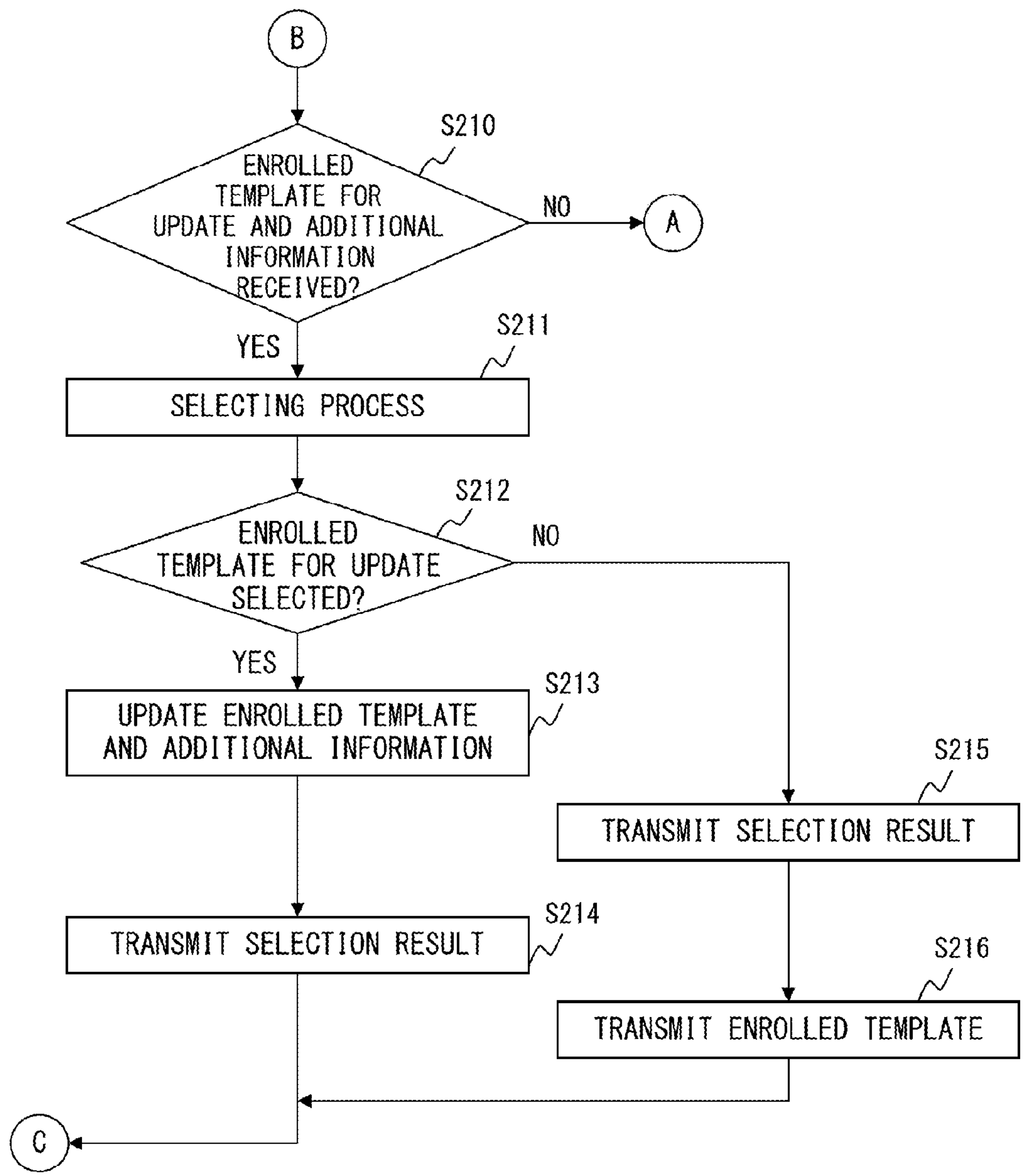

Next, the overall operation of the server device is explained. FIGS. 11A and 11B are flowcharts illustrating the overall operation of the server device.

As illustrated in FIGS. 11A and 11B, first, the authentication unit 202 judges whether biometric information was received by the receiving unit 201 from the client device 10 (S201).

When biometric information was received from the client device 10 (S201, YES), the authentication unit 202 performs matching of the biometric information received by the receiving unit 201 and the enrolled template stored in the storage unit 34 (S202). The authentication unit 202 judges whether the degree of similarity of the biometric information and the enrolled template is equal to or above a threshold (S203). Here, the threshold of the decree of similarity is assumed as 80%.

When the degree of similarity is equal to or above the threshold (S203, YES), the notifying unit 203 transmits the authentication result indicating the acceptance of biometric information and success of the authentication to the client device 30 (S204). The updating unit 204 updates the accepted rate (S205). The accepted rate updated here is the accepted rate in the corresponding item in the additional information and the management information corresponding to the enrolled template, and each-day and total accepted rate in the corresponding item in the frequency information. The updating unit 204 increments the acceptance count and the authentication count in these accepted rates. The updating unit 204 replaces the matching information in the additional information with the biometric information accepted by the authenticating unit 202 (S206), and judges whether the accepted rate in the additional information is equal to or above a specified threshold (S207). Here, the threshold of the accepted rate is assumed as 50%.

When the accepted rate is equal to or below the threshold (S207, YES), the updating unit 204 creates a enrolled template based on the biometric information accepted by the authentication unit 202 (S208). The updating unit 204 replaces the enrolled template stored in the storage unit 34 with the created enrolled template and updates the additional information (S209). In this update, the update unit 204 sets 0/0 as the accepted rate, and sets the current date/time as the creation date/time. Meanwhile, in accordance with this update, the updating unit 204 may also update the accepted rate, the creation date/time and the like corresponding to the additional information being the update target in the management information. Then the updating unit 204 judges whether the enrolled template for update and the additional information corresponding to the template were received by the receiving unit 201 (S210).

When the enrolled template for update and the additional information were received (S210, YES), the selecting unit 205 executes the selecting process described later (S211). The updating unit 204 judges whether the enrolled template for update was selected by the selecting process (S212).

When the enrolled template for update was selected (S212, YES), the updating unit 204 updates the enrolled template and the additional information stored in the storage unit 34 (S213). Here, the update unit 204 replaces the enrolled template stored in the storage unit 34 with the enrolled template for update, and replaces the additional information stored in the storage unit 34 with the received additional information. Meanwhile, in accordance with this update, the updating unit 204 may also update the accepted rate, the creation date/time and the like corresponding to the additional information being the update target in the management information. The transmitting unit 206 transmits the selection result to the client device 10 being the transmission source of the enrolled template for update (S214). Then the authentication unit 202 judges whether biometric information was received from the client device 10 by the receiving unit 201, again (S201).

Meanwhile, when the enrolled template for update was not received (S212, NO), the transmitting unit 206 transmits the selection result to the client device (S215), and transmits the enrolled template stored in the storage unit 34 to the client device 10 (S216). Then the authentication unit 202 judges whether biometric information was received from the client device 10 by the receiving unit 201, again (S201).

In the judgment in step S210, when the enrolled template for update and the additional information were not received (S210, NO), the authentication unit 202 judges whether biometric information was received from the client device 10 by the receiving unit 201, again (S201).

In the judgment in step S207, when the accepted rate is not equal to or below the prescribed threshold (S207, NO), the updating unit 209 judges whether the enrolled template for update and the additional information corresponding to the template were received by the receiving unit 201 (S210).

Meanwhile, in the judgment in step S203, when the degree of similarity is not equal to or above the threshold (S203, NO), the notifying unit 203 transmits the authentication result indicating the discarding of the biometric information and failure of authentication to the client device 10 (S217). The updating unit 204 updates the accepted rate (S218). The accepted rate updated here is the accepted rate in the corresponding item in the additional information and the management information corresponding to the enrolled template, and each-day and total accepted rate in the corresponding item in the frequency information. The updating unit 204 increments the authentication count in these accepted rates. Then the authentication unit 202 judges whether biometric information was received from the client device 10 by the receiving unit 201, again (S201).

Meanwhile, in the judgment in step S201, when biometric information was not received (S201, NO), the authentication unit 202 judges whether biometric information was received from the client device 17 by the receiving unit 201, again (S201).

Figure 12A:
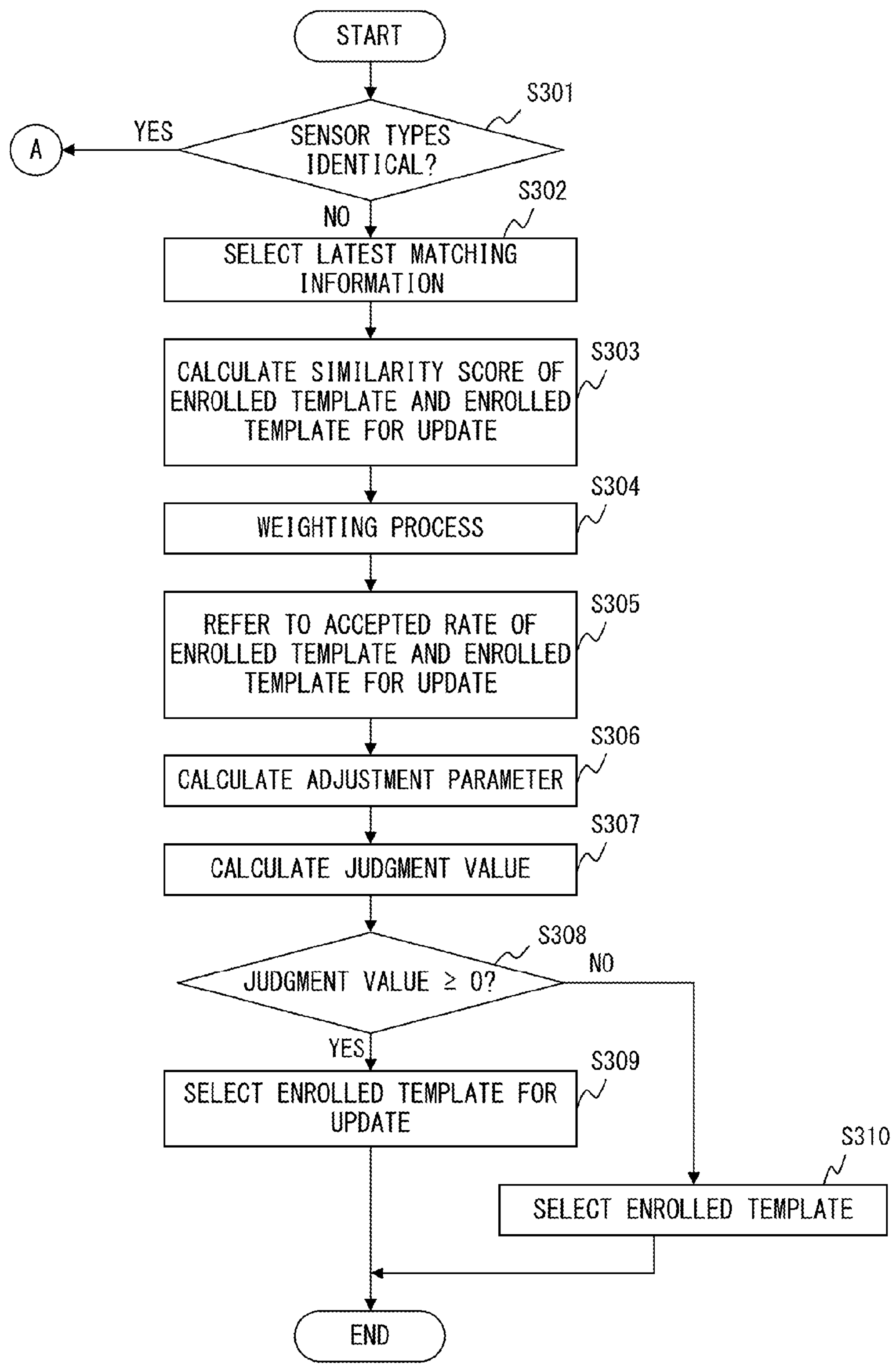
FIGS. 12A and 12B are flowcharts illustrating the operation of a selecting process according to the first embodiment.
Figure 12B:
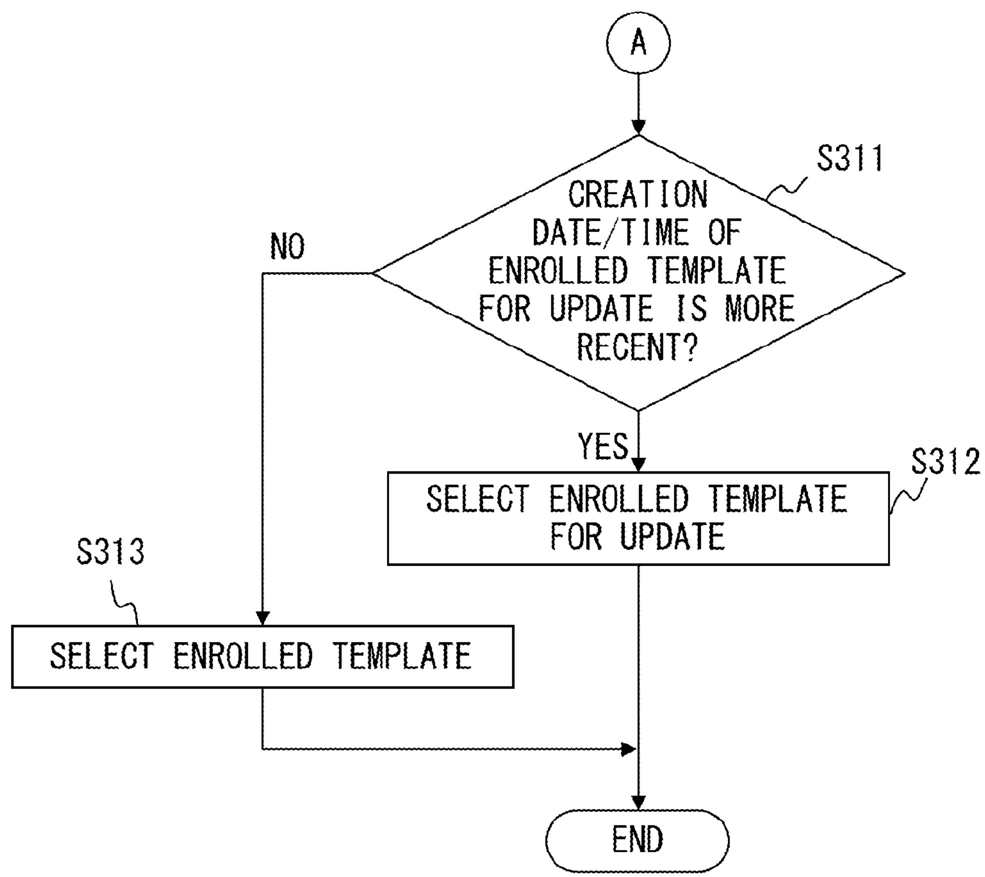

Next, the operation of the selecting process is explained. FIGS. 12A and 12B are flowcharts illustrating the operation of the selecting process.

As illustrated in FIGS. 12A and 12B, first, the selecting unit 205 refer to the sensor type pattern in the additional information received by the receiving unit 205 and the sensor type pattern in the additional information stored in the storage unit 34, to judge whether the sensor types of the enrolled template for update and the enrolled template are the same (S301).

When the sensor types are not the same (S301, NO), the selecting unit 205 selects the latest matching information between the additional information received by the receiving unit 201 and the additional information stored in the storage unit 34 (S302). Here, the latest matching information refers to the matching information with more recent input date/time included in the matching information.

The selecting unit 205 calculates the similarity score of the enrolled template and the enrolled template for update (S303). The similarity score represents the degree of similarity with the selected matching information. The degree of similarity is calculated based on minutia information in the similar manner to the matching of biometric information. The selecting unit 205 performs an weighting process to determine a weighting value for each of the enrolled template and the enrolled template for update (S304). The weighting process is described later.

The selecting unit 205 refers to the frequency of authentication in the additional information received by the receiving unit 201 and the additional information stored in the storage unit 34 (S305), to calculate an adjustment parameter (S306). The adjustment parameter is a value based on the acceptance count in the accepted rate in different input environments, which is a parameter for making enrolled data created by the client device 10 with a high probability of being used for biometric authentication selected easily. The selecting unit 205 calculates the adjustment parameter based on the acceptance count as the numerator of the accepted rate and the sensor type pattern in the additional information received by the receiving unit 201 and the additional information stored in the storage unit 34.

The selecting unit 205 calculates a judgment value $\phi$ (S307). The a judgment value $\phi$ is calculated by the following formula, assuming the weighting value of the enrolled template for update as W_c, the similarity score of the enrolled template for update as Sc_c, the weighting value of the enrolled template as W_s, the similarity score of the enrolled template as Sc_s, the adjustment parameter as a.

$$\phi = W\_c \times Sc\_c - W\_s \times Sc\_s + a$$

The selecting unit 205 judges whether the judgment value $\phi$ is equal to or larger than 0 (S308).

When the judgment value $\phi$ is equal to or larger than 0 (S308, YES), the selecting unit 205 selects the enrolled template for update (S309), and terminates the selecting process.

Meanwhile, when the judgment value $\phi$ is not equal to or larger than 0 (S308, NO), the selecting unit 205 selects the enrolled template (S310).

Meanwhile, in the judgment in step S301, when the sensor types are the same (S301, YES), the selecting unit 205 judges whether the creation date/time in the additional information received by the receiving unit 201 is more recent than the creation date/time in the additional information stored in the storage unit 34 (S311). That is, the selecting unit 205 judges whether the creation date/time of the enrolled template for update is more recent than that of the enrolled template.

When the creation date/time of the enrolled template for update is more recent than that of the enrolled template (S311, YES), the selecting unit 205 selects the enrolled template for update (S312), and terminates the selecting process.

Meanwhile, when the creation date/time of the enrolled template for update is not more recent than that of the enrolled template (S311, NO), the selecting unit 205 selects the enrolled template (S313), and terminates the selecting process.

Figure 13:
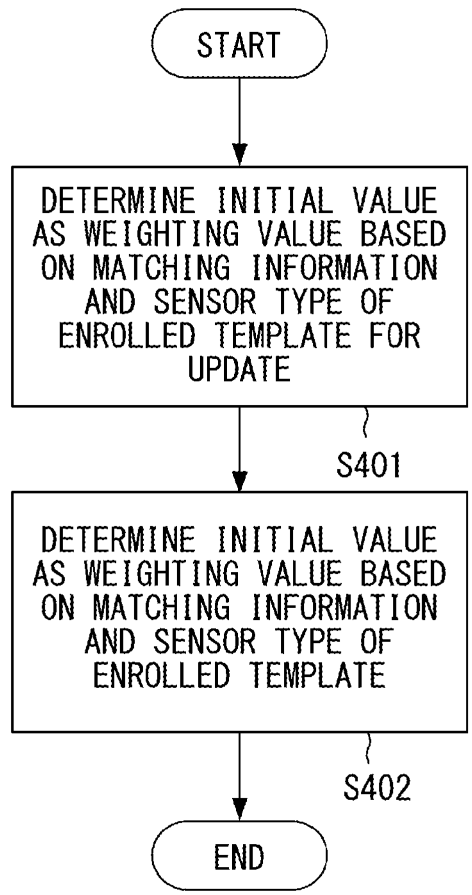
FIG. 13 is a flowchart illustrating the operation of a weighting process in the first embodiment.

Next, the operation of the weighting process in the first embodiment is explained. FIG. 13 is a flowchart illustrating the operation of the weighting process in the first embodiment.

As illustrated in FIG. 13, the selecting unit 205 refers to the weighting information, and determines the initial value corresponding to the sensor type pattern in the additional information received by the receiving unit 201 as the weighting value of the enrolled template for update (S401). Next, the selecting unit 205 refers to the weighting information, and determines the initial value corresponding to the sensor type pattern in the additional information stored in the storage unit 34 as the weighting value of the enrolled template (S402), and terminates the weighting process.

As described above, in updating the enrolled template of the server device 30, by selecting either the enrolled template for update or the enrolled template in consideration of the sensor type at the time of the input, the enrolled template is updated to appropriate biometric information. Meanwhile, while the initial value is assumed to be set based on the sensor type in the first embodiment, as long as the initial value represents the input environment of the biometric information, it may be anything. As such an input environment, presence/absence of external light for the input sensor 17, the direction of external light, the luminosity of external light at the installed position, and the like. In addition, while it is assumed that fingerprint authentication is used as biometric information, any biometric information may be used as long as it is biometric authentication.

Second Embodiment

In the first embodiment described above, the weighting value is the initial value for the sensor type pattern, and the initial value is a value set in advance. The second embodiment differs from the first embodiment in that a system value is calculated, and the system value is set as the weighting value. Due to this difference, the server device 30 according to the second embodiment performs a system value calculating process before the updating process of the accepted rate after the acceptance of biometric authentication in the authentication unit 202. Hereinafter, as the difference from the first embodiment, the weighting information including the system value, the system value calculating process, and the weighting process in the second embodiment are explained.

First, a weighting table in the second embodiment is explained. FIG. 14 illustrates the weighting table in the second embodiment.

As illustrated in FIG. 14, in the second embodiment, the weighting table further associates the system value, in addition to the sensor type pattern, the initial value. The system value is not a value set in advance like the initial value, but a value calculated by the system value calculating process described later, therefore it may not be determined yet, like the system value associated with the sensor type patterns "Type1/Type2".

Figure 15:
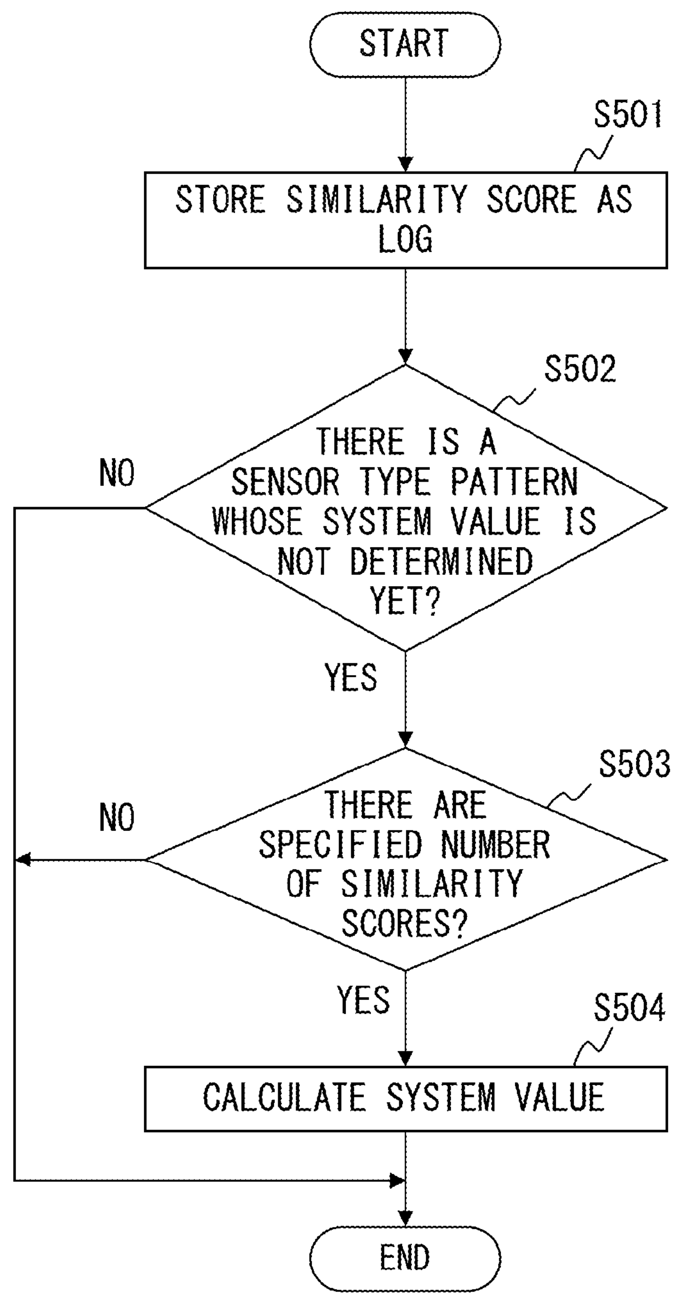
FIG. 15 is a flowchart illustrating an operation of a system value calculation process.

FIG. 15 is a flowchart illustrating the operation of the system value calculating process. The system value calculating process is performed after the process in step S204 in FIG. 11A. FIG. 16 illustrates the distribution of the similarity scores.

As illustrated in FIG. 15, first, the selecting unit 205 stores the degree of similarity (similarity score) calculated in the matching with the enrolled template in S202 as a log, for each sensor type pattern (S501). Next, the selecting unit 205 judges whether there is a sensor type pattern whose system value is not determined yet, in the weighting table (S502).

When there is a sensor type pattern whose system value is not determined yet (S503, YES), the selecting unit 205 judges, whether there are a specified number or more of logs for the sensor type pattern whose system value is not determined yet (S503).

When there are specified number or more of logs of the similarity score (S503, YES), the selecting unit 205 calculates the system value based on these logs and the frequency information (S504), and terminates the system value calculating process.

On the other hand, when there are less logs of the similarity score than the specified number (S503, NO), the selecting unit 205 terminates the system value calculating process.

Meanwhile, in the judgment in step S502, when there is no sensor type pattern whose system value is not determined yet (S503, NO), the selecting unit 205 terminates the system value calculating process.

Here, the calculating method of the system value is explained with reference to FIG. 16. In FIG. 16, the vertical axis represents the frequency of appearance, and the horizontal axis represents the similarity score. Graph A represents the distribution of the similarity scores in the sensor type pattern "Type1/Type1". Graph B represents the distribution of the similarity scores in the sensor type pattern "Type2/Type2". Graph C represents the distribution of the similarity scores in the sensor type pattern "Type2/Type1". Graph D represents the distribution of the similarity scores in the sensor type pattern "Type1/Type2". These distributions of the similarity scores are based on the log of the similarity score for each sensor type. The selecting unit 205 sets, first, the representative values of the score distributions illustrated as the graphs A, B, C, D as m1, m2, m3, m4, respectively. These representative values are calculated, for example, by approximating the score distribution by normal distribution, and obtaining its average value. Next, the selecting unit 205 sets the system value of the sensor type pattern with the highest similarity score as 1. For the other sensor type patterns, the selecting unit 205 calculates the ratio of the representative value with respect to the sensor type pattern with the highest representative value as the system value. Furthermore, the selecting unit 205 multiples the system value of the sensor type pattern being the combination of the sensors of different systems with a correction value R. The correction value R is a parameter indicating the difficulty of authentication in a case in which the type of the sensor to which biometric information being the basis of the enrolled template is input and the type of the sensor to which biometric information input at the time of authentication are different. In addition, the correction value R is set at a value larger than 1, and the larger value represents the greater difficulty of authentication. In addition, the correction value R is calculated in advance based on the degree of similarity of two sets of biometric information input by the input sensors of the same sensor type, and the degree of similarity of two sets of biometric information input by the input sensors of the different sensor type.

Taking FIG. 16 as an example, the sensor type pattern with the highest representative value is "Type1/Type1". In this case, the system value for each sensor type pattern is calculated as follows.

Type1/Type1:1

Type1/Type2:$m1/m4$

Type2/Type1:$m1/m3 \times R$

Type2/type2:$m1/m2 \times R$

Figure 17:
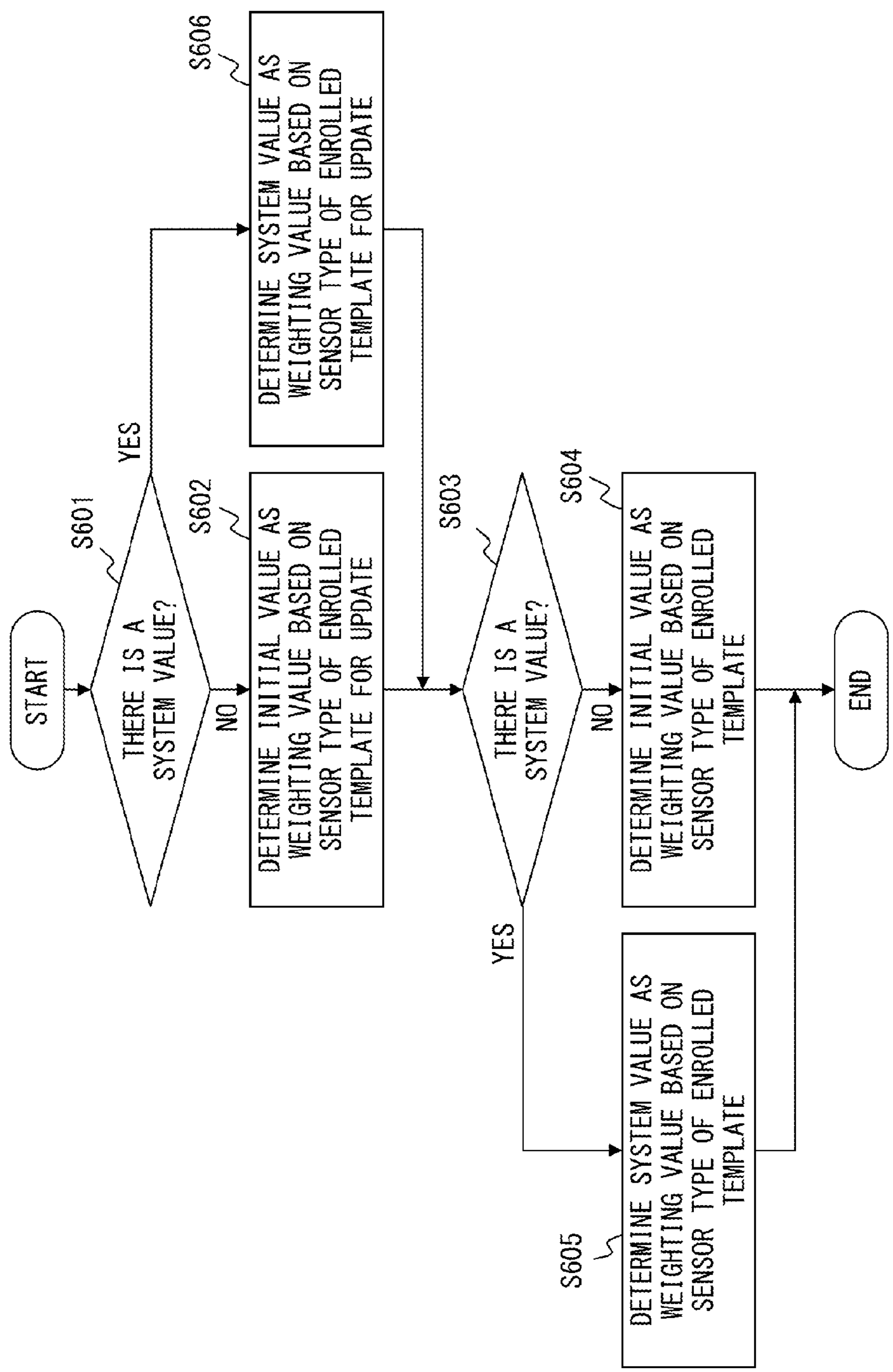
FIG. 17 is a flowchart illustrating the operation of a weighting process in the second embodiment.

Next, the weighting process in the second embodiment is explained. FIG. 17 is a flowchart illustrating the operation of the weighting process in the second embodiment.

As illustrated in FIG. 17, first, the selecting unit 205 judges whether there is a system value corresponding to the sensor type pattern in the additional information received by the receiving unit 201 (S601).

When a system value does not exist (S601, NO), the selecting unit 205 determines, in the weighting information, the initial value corresponding to the sensor type pattern in the additional information received by the receiving unit 201 as the weighting value of the enrolled template for update (S602). Meanwhile, when there is a system value in the judgment in step S601 (S601, YES), the selecting unit 205 determines, in the weighting information, the system value corresponding to the sensor type pattern in the additional information received by the receiving unit 210 as the weighting value of the enrolled template for update (S606). Next, the selecting unit 205 judges whether there is a system value corresponding to the sensor type pattern in the additional information stored in the storage unit (S603).

When a system value does not exist (S603, NO), the selecting unit 205 determines, in the weighting information, the initial value corresponding to the sensor type pattern in the additional information stored in the storage unit 34 as the weighting value of the enrolled template (S604), and the terminates the weighting process.

On the other hand, when there is a system value (S603, YES), the selecting unit 205 determines, in the weighting information, the system value corresponding to the sensor type pattern in the additional information stored in the storage unit 34 as the weighting value of the enrolled template (S605), and terminates the weighting process.

As described, the server device 30 according to the second embodiment uses the system value calculated based on the distribution of the degree of similarity of each sensor type pattern as the weighting value. Accordingly, the weighting value becomes more appropriate compared with the case of using the initial value, and as a result, it becomes possible to select a more appropriate enrolled template as the update target.

Third Embodiment

In third embodiment described above, the weighting value is a system value with respect to the sensor type pattern, and the system value is a value calculated based on the degree of similarity of each sensor type pattern. The third embodiment differs from the second embodiment in that a personal value is calculated, and the personal value is set as the weighting value. Due to this difference, the server device 30 in the third embodiment performs the personal value calculating process before the updating process of the accepted rate after the acceptance of biometric authentication in the authentication unit 202. Hereinafter, as the difference from the second embodiment, the weighting information including the personal value, the personal calculating process, and the weighting process in the third embodiment are explained.

First, the weighting information in the third embodiment is explained. FIG. 18 illustrates the weighting information in the third embodiment.

As illustrated in FIG. 18, in the third embodiment, the weighting table associates the personal value, in addition to the sensor type pattern, the initial value, the system value. The personal value is different from the initial value and the system value, which is associated with the combination of the sensor type pattern and the user ID. In addition, since the personal value is a value calculated by the personal value calculating process described later, it may not be determined yet, like the system value associated with User003 of Type1/Type1.

Figure 19:
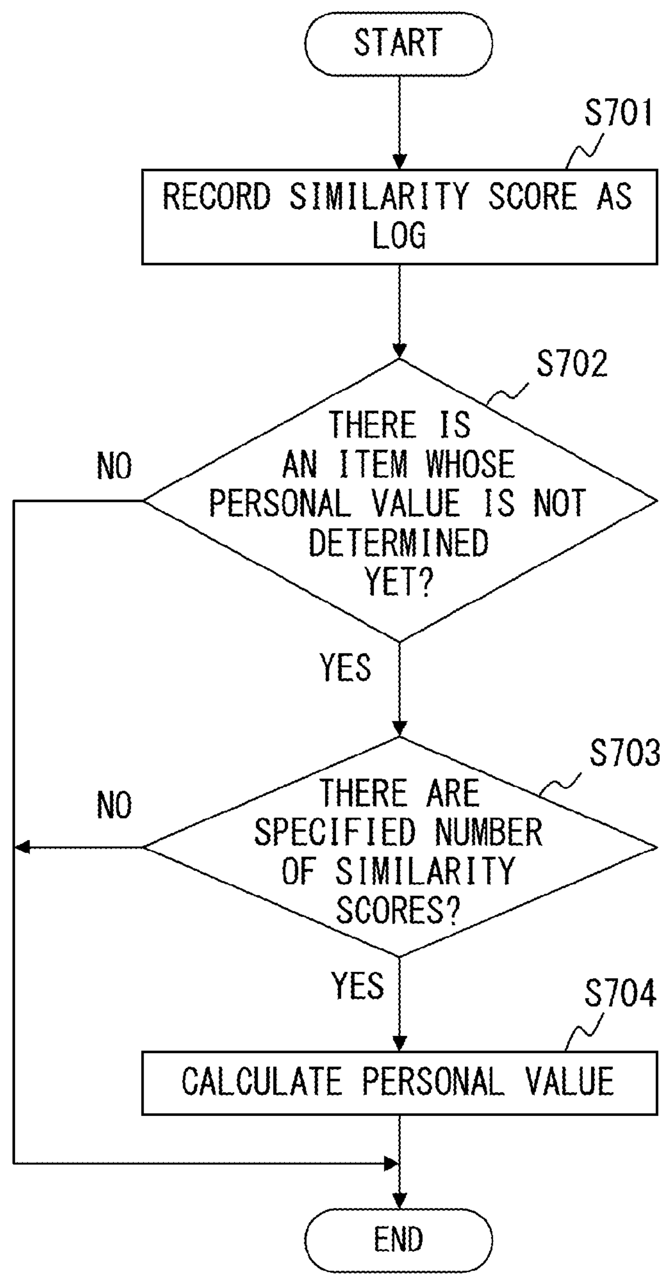
FIG. 19 is a flowchart illustrating the operation of a personal value calculation process.

Next, the operation of the personal value calculating process is explained. FIG. 19 is a flowchart illustrating the operation of the personal value calculating process. The personal value calculating process is performed after the system value calculating process described in the second embodiment.

As illustrated in FIG. 19, first, the selecting unit 205 stores the degree of similarity (similarity score) calculated in the matching with the enrolled template in S202 as a log, for each combination of the sensor type and the user ID, in the storage unit 34 (S701). Next, the selecting unit 205 judges whether there is an item whose personal value is not determined yet, in the weighting table (S702).

When there is an item whose personal value is not determined yet (S702, YES), the selecting unit 205 judges, for the combination of the sensor type and the user ID whose personal value is not determined yet, whether there are specified number or more of logs (S703).

When there are specified number or more of logs (S703, YES), the selecting unit 205 calculates the personal value based on these logs and the frequency information (S704), and terminates the personal value calculating process.

On the other hand, when there are less logs of the similarity score than the specified number (S703, NO), the selecting unit 205 terminates the personal value calculating process.

Meanwhile, in the judgment in step S702, when there is no item whose personal value is not determined yet (S702, NO), the selecting unit 205 terminates the personal value calculating process.

The calculating method of the personal value is the same as the calculating method of the system value, except that the calculation is made for each combination of the sensor type pattern and the user ID, and that the representative value of the distribution of the similarity scores based on the log stored for each combination of the sensor type and the user ID.

Figure 20:
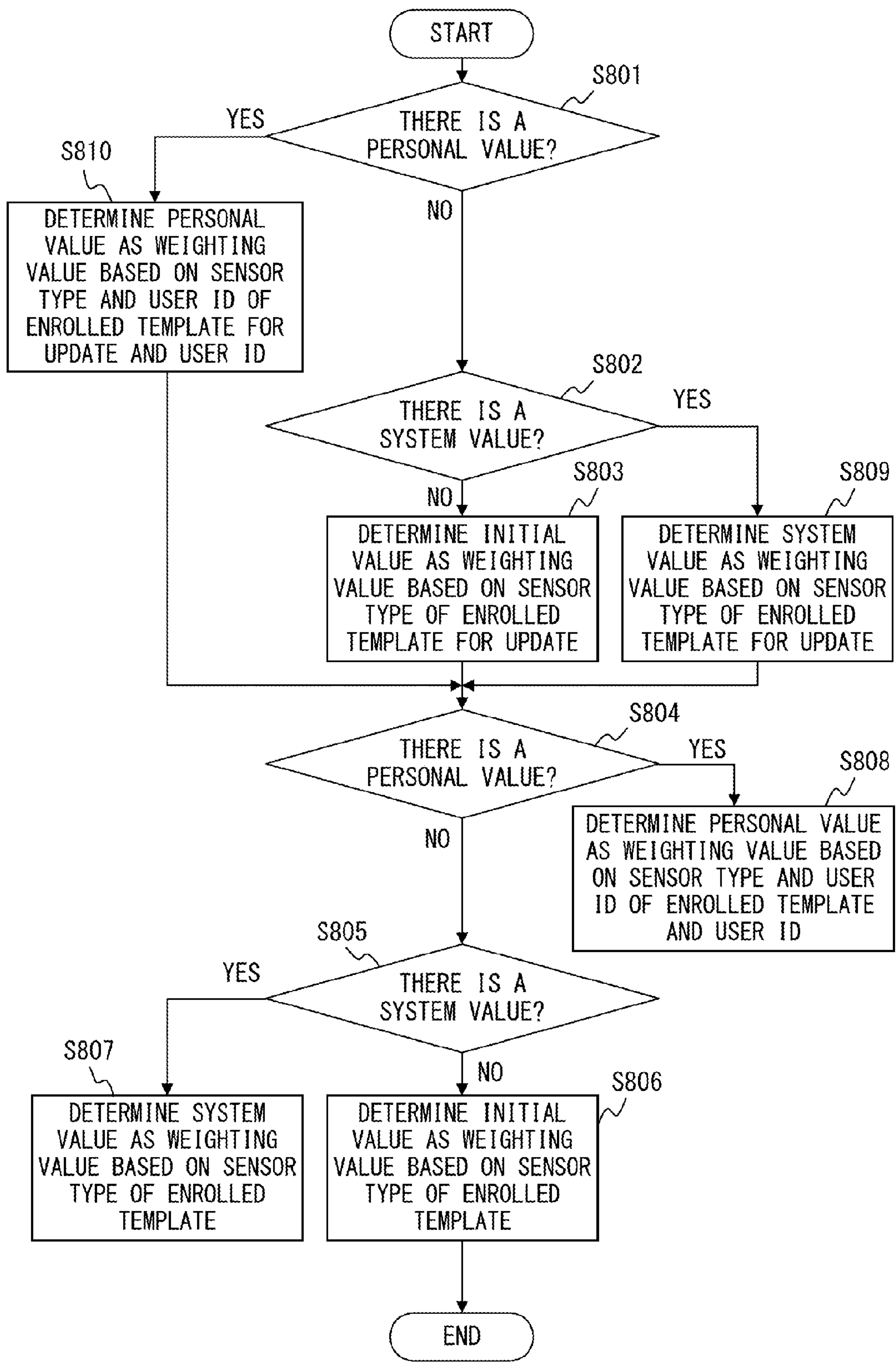
FIG. 20 is a flowchart illustrating the operation of a weighting process in the third embodiment.

Next, the weighting process in the third embodiment is explained. FIG. 20 is a flowchart illustrating the operation of the weighting process in the third embodiment.

As illustrated in FIG. 20, first, the selecting unit 205 judges whether there is a personal value corresponding to the sensor type and the user ID in the additional information received by the receiving unit 201, in the weighting information (S801).

When a personal value does not exist (S801, NO), the selecting unit 205 judges whether there is a system value corresponding to the sensor type pattern in the additional information received by the receiving unit 201 (S802).

When a system value does not exist (S802, NO), in the weighting information, the initial value corresponding to the sensor type patter in the additional information received by the receiving unit 201 is set as the weighting value of the enrolled template for update (S803). Next, the selecting unit 205 judges, in the weighting information, whether there is a personal value corresponding to the sensor type and the user ID in the additional information stored in the storage unit 34 (S804).

When a personal value does not exist (S804, NO), the selecting unit 205 judges, in the weighting information, whether there is a system value corresponding to the sensor type in the additional information stored in the storage unit 34 (S805).

When a system value does not exist (S805, NO), the selecting unit 205 determines, in the weighting information, the initial value corresponding to the sensor type pattern in the additional information stored in the storage unit 34 as the weighting value of the enrolled template (S806), and the weighting process is terminated.

On the other hand, when there is a system value (S805, YES), the selecting unit 205 determines, in the weighting information, the system value corresponding to the sensor type pattern in the additional information stored in the storage unit 34 as the weighting value of the enrolled template (S807), and terminates the weighting process.

Meanwhile, in the judgment in step S804, when there is a personal value (S804, YES), the selecting unit 205 determines the personal value corresponding to the sensor type pattern and the user ID in the additional information stored in the storage unit 34 as the weighting value of the enrolled template (S808), and terminates the weighting process.

Meanwhile, in the judgment in step S802, when there is a system value (S802, YES), the selecting unit 205 determines the system value corresponding to the sensor type pattern in the additional information received by the receiving unit 201 as the weighting value of the enrolled template for update (S809). Next, the selecting unit 205 judges, in the weighting information, whether there is a personal value corresponding to the sensor type and the user ID in the additional information stored in the storage unit (S804).

Meanwhile, in the judgment in step S801, when there is a personal value (S801, YES), the selecting unit 205 determines the personal value corresponding to the sensor type pattern and the user ID in the additional information received by the receiving unit 201 as the weighting value of the enrolled template for update (S810). Next, the selecting unit 205 judges, in the weighting information, whether there is a personal value corresponding to the sensor type and the user ID in the additional information stored in the storage unit 34 (S804).

As described above, the server device 30 according to the third embodiment uses the personal value calculated based on the distribution of the degree of similarity for each combination of the sensor type and the user ID as the weighting value. Accordingly, the characteristics specific to the user such as a habit in inputting biometric information is taken into consideration, and as a result, a more appropriate enrolled template may be selected.

The present invention may be applied in a computer system such as the one described below. FIG. 21 illustrates an example of a computer system to which the present invention is applied. A computer system 900 illustrated in FIG. 21 includes a main body unit 901 including a CPU, a disk drive and the like, a display device 902 that displays an image according to the instruction from the main body unit 901, a keyboard 903 for inputting various information to the computer system 900, a mouse 904 that specifies a position on a display screen 902*a* of the display device 902, a communication device 905 that accesses an external database and the like and downloads a program and the like stored in another computer system. As the communication device 905, a network communication card, a modem and the like are possible.

In a computer system constituting the server device 30 described above, a program that makes each step described above executed may be provided as a biometric authentication program. This program may be executed by the computer system constituting the server device 30 by making it stored in a recording medium that is readable by the computer system. The program to execute each step described above is stored in a removable recording medium such as a disk 910 and the like, or downloaded from a recording medium 906 of another computer system by the communication device 905. In addition, a biometric authentication program that gives the computer system 900 at least a biometric authentication function is input to the computer system 900 and executed. The program makes the computer system 900 operate as a biometric authentication system that has a biometric authentication function. In addition, the program may be stored in a computer-readable recording medium such as the disk 910. Here, a recording medium that is readable by the computer system 900 includes an internal storage device mounted inside the computer such as a ROM and RAM, the disk 910 and a flexible disk, a DVD disk, an magneto-optical disk, a removable storage medium such as an IC card, a database that stores a computer program, or, another computer system and its database, and various recording media that are accessible by media by a computer system connected via communication means such as the communication device 905.

The present invention may be implemented in other various forms without deviating from its spirit or its main features. Therefore, the embodiments described above are simply examples in various respects, and may not be understood in a limiting way. The scope of the present invention is represented by the claims, and is not restricted by the description herein. Furthermore, various modifications, various improvements, replacements and reforming belong to the equivalent range of the claims are all within the scope of the present invention.

Meanwhile, the first enrolled template described in the claims is the enrolled template stored in the storage unit 34 in the embodiments above for example, and the first information is the additional information stored in the storage unit 34 for example. The second enrolled template is the enrolled template stored in the storage unit 15 for example, and the second information is the additional information stored in the storage unit 15 for example. The attribute information is the additional information stored respectively in the storage unit 15 and the storage unit 34 for example.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A biometric authentication device that performs biometric authentication based on biometric information input to a connected terminal device, the biometric authentication device comprising:

a storage device configured to store a first enrolled template and first information including a parameter representing a type of a first input sensor to which the first enrolled template was input;

a receiver configured to receive biometric information transmitted from the terminal device, a second enrolled template stored in the terminal device, and second information including a parameter representing a type of a second input sensor to which the second enrolled template was input; and a processor configured to execute a process comprising:

performing authentication of a person who inputs the biometric information by matching the received biometric information and the first enrolled template;

calculating a judgement value $\phi$ according to a formula below in which Wc indicates a weighting value of the second enrolled template, Sc_c indicates a similarity between the received biometric information and the second enrolled template, Ws indicates a weighting value of the first enrolled template, Sc_s indicates a similarity between the received biometric information and the first enrolled template, and A indicates an adjustment parameter;

$$\phi = Wc \times Sc\_c - Ws \times Sc\_s + A$$

selecting the first enrolled template or the second enrolled template based on the first information, the second information, and the judgement value $\phi$; and replacing the first enrolled template stored in the storage device with the second enrolled template that is received by the receiver from the terminal device when the second enrolled template is selected, wherein when the received biometric information is accepted in the authentication, and when the type of the first input sensor and the type of the second input sensor are different from each other, and when the judgement value $\phi$ is larger than or equal to zero, the processor selects the second enrolled template and replaces the first enrolled template stored in the storage device with the second enrolled template.

2. The biometric authentication device according to claim 1, wherein the first information further includes a parameter representing an accepted rate of authentication with the first enrolled template in the biometric authentication device, and the second information further includes a parameter representing an accepted rate of authentication with the second enrolled template in the terminal device.

3. The biometric authentication device according to claim 1, wherein the first information further includes biometric information accepted in authentication with the first enrolled template, and the second information further includes biometric information accepted in authentication with the second enrolled template in the terminal device.

4. The biometric authentication device according to claim 3, wherein the processor selects either the first enrolled template or the second enrolled template, based on the parameter representing an input environment in the first information, a parameter representing an input environment in the second information, and biometric information with a more recent input date/time among biometric information in the first information or biometric information in the second information.

5. The biometric authentication device according to claim 1, further comprising a transmitter configured to transmit the first enrolled template to the terminal device when the first enrolled template is selected by the processor.

6. A non-transitory computer-readable recording medium having stored therein a program for causing a biometric authentication device to execute a biometric authentication process based on biometric information input to a connected terminal device, the biometric authentication process comprising:

receiving biometric information transmitted from the terminal device, a second enrolled template stored in the terminal device, and second attribute information including a parameter representing a type of a second input sensor to which the second enrolled template was input;

performing authentication of a person who inputs the biometric information by matching the received biometric information and a first enrolled template stored in a storage unit of the biometric authentication device;

calculating a judgement value $\phi$ according to a formula below in which Wc indicates a weighting value of the second enrolled template, Sc_c indicates a similarity between the received biometric information and the second enrolled template, Ws indicates a weighting value of the first enrolled template, Sc_s indicates a similarity between the received biometric information and the first enrolled template, and A indicates an adjustment parameter;

$$\phi = Wc \times Sc\_c - Ws \times Sc\_s + A$$

selecting the first enrolled template or the second enrolled template based on the received second attribute information, first attribute information including a parameter representing a type of a first input sensor to which the first enrolled template was input, and the judgement value $\phi$; and replacing the first enrolled template stored in the storage unit with the second enrolled template that is received from the terminal device, when the second enrolled template is selected, wherein when the received biometric information is accepted in the authentication, and when the type of the first input sensor and the type of the second input sensor are different from each other, and when the judgement value $\phi$ is larger than or equal to zero, the biometric authentication process selects the second enrolled template and replaces the first enrolled template stored in the storage unit with the second enrolled template.

7. The non-transitory computer-readable recording medium according to claim 6, wherein the first attribute information stored in the storage unit further includes a parameter representing an accepted rate of authentication with the first enrolled template, and the received second attribute information further includes a parameter representing an accepted rate of authentication with the second enrolled template in the terminal device.

8. The non-transitory computer-readable recording medium according to claim 6, wherein the first attribute information stored in the storage unit further includes biometric information accepted in authentication with the first enrolled template in the biometric authentication device, and the received second attribute information further includes biometric information accepted in authentication with the second enrolled template in the terminal device.

9. A biometric authentication method used in a biometric authentication system including a terminal device and a biometric authentication device that performs biometric authentication based on biometric information input in the terminal device, the biometric authentication method comprising:

transmitting, by the terminal device, input biometric information, a second enrolled template stored in the terminal device, and second attribute information including a parameter representing a type of a second input sensor to which the second enrolled template was input to the biometric authentication device;

receiving, by the biometric authentication device, biometric information transmitted from the terminal device;

performing authentication of a person who inputs the biometric information by matching the received biometric information and a first enrolled template stored in a storage unit of the biometric authentication device;

calculating a judgement value $\phi$ according to a formula below in which Wc indicates a weighting value of the second enrolled template, Sc_c indicates a similarity between the received biometric information and the second enrolled template, Ws indicates a weighting value of the first enrolled template, Sc_s indicates a similarity between the received biometric information and the first enrolled template, and A indicates an adjustment parameter;

$$\phi = Wc \times Sc\_c - Ws \times Sc\_s + A$$

selecting the first enrolled template or the second enrolled template based on the received second attribute information, first attribute information including a parameter representing a type of a first input sensor to which the first enrolled template was input, and the judgement value $\phi$; and replacing the first enrolled template stored in the storage unit with the second enrolled template that is received from the terminal device, when the second enrolled template is selected, wherein when the received biometric information is accepted in the authentication, and when the type of the first input sensor and the type of the second input sensor are different from each other, and when the judgement value $\phi$ is larger than or equal to zero, the second enrolled template is selected and the first enrolled template stored in the storage unit is replaced with the second enrolled template.

10. The biometric authentication method according to claim 9, wherein the first attribute information stored in the storage unit of the biometric authentication device further includes a parameter representing an accepted rate of authentication with the first enrolled template, and the received second attribute information further includes a parameter representing an accepted rate of authentication with the second enrolled template in the terminal device.

11. The biometric authentication method according to claim 9, wherein the first attribute information stored in the storage unit of the biometric authentication device further includes biometric information accepted in authentication with the first enrolled template in the biometric authentication device, and the received second attribute information further includes biometric information accepted in authentication with the second enrolled template in the terminal device.

12. The biometric authentication device according to claim 1, wherein one of the first input sensor and the second input sensor is a flat-type fingerprint sensor and the other of the first input sensor and the second input sensor is a slide-type fingerprint sensor.

* * * * *